US011828178B2

(12) United States Patent
Kotenberg et al.

(10) Patent No.: US 11,828,178 B2
(45) Date of Patent: Nov. 28, 2023

(54) LUNAR EXCAVATION AND PROJECTILE TRANSPORT SYSTEMS AND METHODS

(71) Applicant: Oshkosh Corporation, Oshkosh, WI (US)

(72) Inventors: Annelise Kotenberg, Oshkosh, WI (US); Alex Bare, Oshkosh, WI (US); Christian Becker, Oshkosh, WI (US); Mark Charniak, Neenah, WI (US); Zac Hassman, Oshkosh, WI (US); Jacob Klaameyer, Oshkosh, WI (US); Nick Winter, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

(21) Appl. No.: 17/842,137

(22) Filed: Jun. 16, 2022

(65) Prior Publication Data

US 2022/0403740 A1    Dec. 22, 2022

Related U.S. Application Data

(60) Provisional application No. 63/212,058, filed on Jun. 17, 2021.

(51) Int. Cl.
*E21C 51/00* (2006.01)
*E21B 7/24* (2006.01)
*B64G 1/16* (2006.01)

(52) U.S. Cl.
CPC ............... *E21C 51/00* (2013.01); *B64G 1/16* (2013.01); *E21B 7/24* (2013.01)

(58) Field of Classification Search
CPC ........... E21B 7/24; E21B 25/005; B64G 1/16; B64G 200/1071; B64G 99/00; B65G 31/00; B65G 67/00; E21C 51/00; F41B 3/00; F41B 3/03
See application file for complete search history.

(56) References Cited

U.S. PATENT DOCUMENTS

| | | |
|---|---|---|
| 2016/0024921 A1* | 1/2016 | Ethridge .................. H05B 6/72 219/385 |
| 2019/0185077 A1 | 6/2019 | Smith et al. |
| 2021/0116889 A1* | 4/2021 | Keravala ................. E21C 35/24 |
| 2021/0380179 A1 | 12/2021 | Smith et al. |
| 2022/0009381 A1 | 1/2022 | Winter |
| 2022/0009563 A1 | 1/2022 | Andrews et al. |
| 2022/0010601 A1 | 1/2022 | Klaameyer et al. |
| 2022/0042386 A1* | 2/2022 | Xie ........................ E21C 51/00 |
| 2022/0090500 A1* | 3/2022 | Sercel .................... E21C 51/00 |

* cited by examiner

*Primary Examiner* — Christopher J Sebesta
(74) *Attorney, Agent, or Firm* — Foley & Lardner LLP

(57) ABSTRACT

A lunar excavation and projectile transport system includes a projectile launcher having a base and a throwing arm and a projectile catcher. The throwing arm is rotatably coupled to the base and arranged at a mounting angle relative to a central axis defined by the base. The mounting angle defines a lunch angle for a processed core sample that is launched from within the throwing arm during rotation of the throwing arm by an electric motor. The projectile catcher includes a storage body, a plurality of telescoping arms coupled to the storage body, and a fabric wrapped around each of the plurality of telescoping arms to define a catching volume within which the processed core sample launched by the projectile launcher is caught.

20 Claims, 23 Drawing Sheets

LUNAR EXCAVATION AND PROJECTILE TRANSPORT SYSTEMS AND METHODS

CROSS-REFERENCE TO RELATED PATENT APPLICATIONS

This application claims the benefit of and priority to U.S. Provisional Application No. 63/212,058, filed on Jun. 17, 2021, the entire disclosure of which is hereby incorporated by reference herein.

BACKGROUND

The present disclosure relates generally to systems and methods for lunar excavation and transport. In general, the presence of water (e.g., ice) on lunar bodies (e.g., Earth's Moon) has increased interest in harvesting and studying the properties of the lunar water. Conventional excavation and transport systems typically harvest regolith and rely on ground-based transport of the harvested regolith between an excavation site and a launch site.

SUMMARY

One embodiment relates to a lunar excavation and projectile transport system for harvesting icy regolith from below a lunar surface. The lunar excavation and projectile transport system includes a core drill assembly having a drilling platform with a plurality of drill wheels rotatably coupled to the drilling platform and a guide plate including a plurality of guide holes extending through the guide plate and arranged in a array pattern. The core drill assembly further includes a tower crane supported on the drilling platform and an ultrasonic drill coupled to the tower crane so that the ultrasonic drill is configured to selectively move a vertical direction toward and away from the guide plate. The lunar excavation and projectile transport system further includes a rover having a body, a plurality of rover wheels coupled to the body, and a dump bed pivotally coupled to the body, a projectile launcher having a base and a throwing arm, and a projectile catcher. The throwing arm is rotatably coupled to the base and arranged at a mounting angle relative to a central axis defined by the base. The mounting angle defines a lunch angle for a processed core sample that is launched from within the throwing arm during rotation of the throwing arm by an electric motor. The projectile catcher includes a storage body, a plurality of telescoping arms coupled to the storage body, and a fabric wrapped around each of the plurality of telescoping arms to define a catching volume within which the processed core sample launched by the projectile launcher is caught.

Another embodiment relates to a lunar excavation and projectile transport system for harvesting icy regolith from below a lunar surface. The lunar excavation and projectile transport system includes a core drill assembly having a drilling platform with a plurality of drill wheels rotatably coupled to the drilling platform and a guide plate including a plurality of guide holes extending through the guide plate and arranged in a array pattern. The core drill assembly further includes a tower crane supported on the drilling platform and an ultrasonic drill coupled to the tower crane so that the ultrasonic drill is configured to selectively move a vertical direction toward and away from the guide plate. The lunar excavation and projectile transport system further includes a rover having a body, a plurality of rover wheels coupled to the body, and a dump bed pivotally coupled to the body, a projectile launcher having a base, a throwing arm, and a release mechanism, and a projectile catcher. The throwing arm is rotatably coupled to the base and an electric motor is coupled to the throwing arm and configured to selectively rotate the throwing arm at a predefined rotational speed. The throwing arm is mounted to the base so that the throwing arm is arranged at a predefined launch angle relative to the base. The release mechanism includes a protrusion that is configured to selectively unblock a processed core sample within the throwing arm during rotation of the throwing arm to launch the processed core sample from the throwing arm. The projectile catcher includes a storage body, a plurality of telescoping arms coupled to the storage body, and a fabric wrapped around each of the plurality of telescoping arms to define a catching volume within which the processed core sample launched by the projectile launcher is caught.

Still another embodiment relates to a method of excavating and transporting icy regolith. The method includes drilling a core sample from below a lunar surface with an ultrasonic drill, depositing the core sample within a dump bed of a rover, navigating the rover to a processing plant having a hopper, pivoting the dump bed to deposit the core sample within the hopper, feeding a processed core sample into a throwing arm of a projectile launcher, rotating the throwing arm at a predefined rotational speed and selectively releasing the processed core sample to launch the processed core sample toward a projectile catcher, and catching the processed core sample within a catching volume of the projectile catcher.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

In general, the reliance of ground-based transportation for delivering harvested regolith between an excavation site and a launch site requires a large amount of portable energy (e.g., batteries) and limits the amount of regolith that can be transferred between the excavation site and the launch site. According to an exemplary embodiment, a lunar excavation and projectile transport system includes an core drill assembly, a rover, a projectile launcher, and a projectile catcher. In general, the core drill assembly excavates a core sample from below a lunar surface (e.g., below the surface of Earth's Moon) and deposits the core sample into the rover. The rover then drives the harvested core sample to a processing facility that is located between the excavation site and the launch site.

After the harvested core sample is processed by the treatment facility, the processed core sample is fed into the projectile launcher. The projectile launcher spins the processed sample at a predefined speed and releases the processed core sample to launch the processed core sample along a trajectory and into the projectile catcher. The processed core sample is caught by the projectile catcher at the launch site where it can be transported (e.g., back to Earth using a rocket) for processing and analysis. The use of the projectile launcher alleviates the need for the rover to transport the harvested core sample the entire distance between the excavation site and the launch site, and enables the launch site to be located in a different geographic location than the processing site. In this way, for example, core samples can be harvested and processed in a permanently shadowed region (PSR) on the lunar surface and then delivered to the launch site, which can be located outside of the PSR, in a timely fashioned by the projectile launcher.

Lunar Excavation and Projectile Transport System

Figure 1:
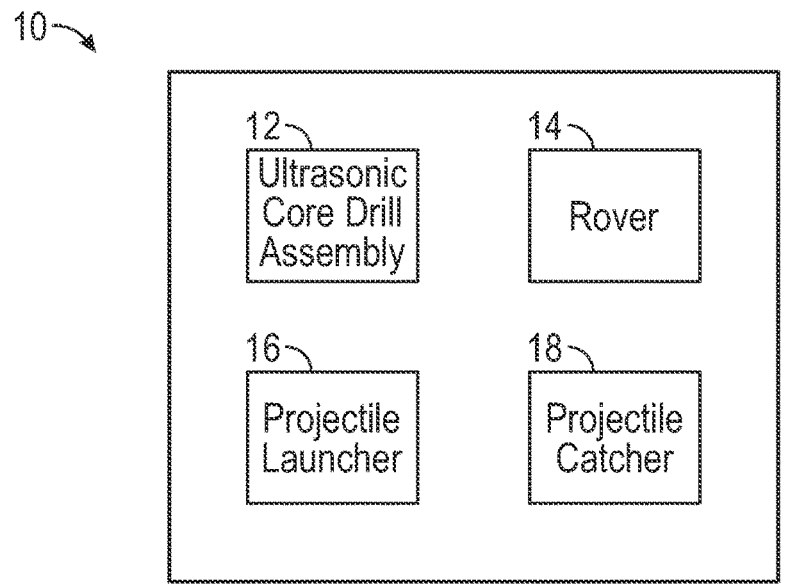
FIG. 1 is a block diagram of a lunar excavation and projectile transport system, according to an exemplary embodiment.

Referring to FIG. 1, a lunar excavation and projectile transport system 10 is illustrated according to an exemplary embodiment. The lunar excavation and projectile transport system 10 includes a core drill assembly 12, a rover 14, a projectile launcher 16, and a projectile catcher 18. In general, the projectile launcher 16 is configured to launch processed core samples along a trajectory into the projectile catcher 18, which reduces a travel distance required by the rover 14 during the transport process.

A. Core Drill Assembly

Figure 2:
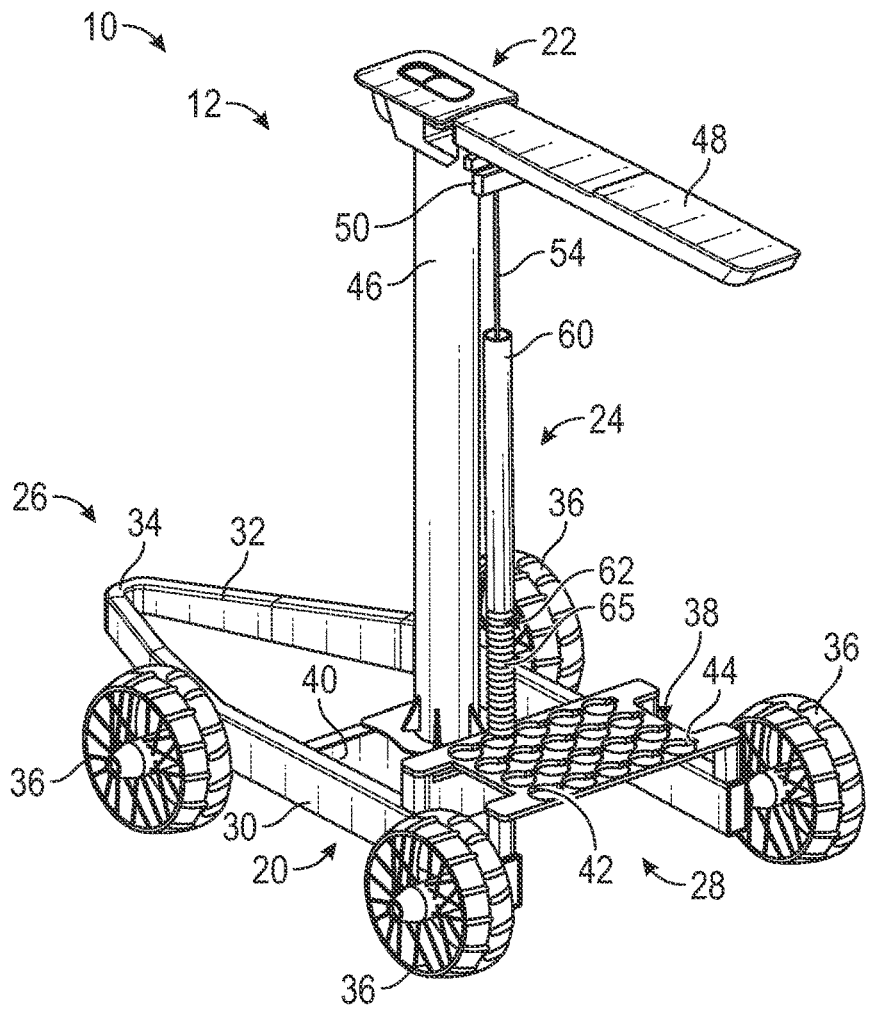
FIG. 2 is a perspective view of a core drill assembly of the lunar excavation and projectile transport system of FIG. 1, according to an exemplary embodiment.
Figure 3:
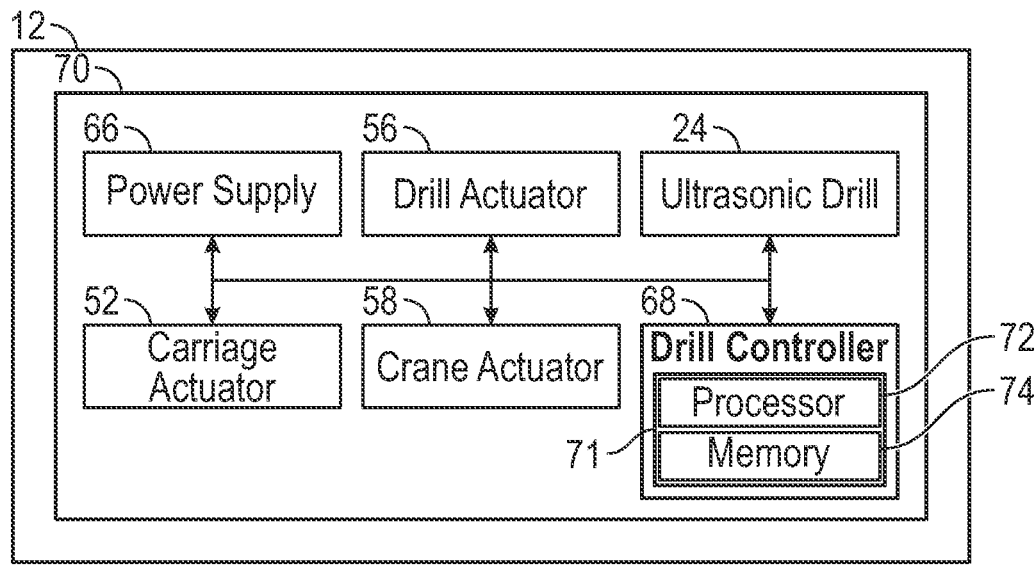
FIG. 3 is a block diagram of components of the core drill assembly of FIG. 2, according to an exemplary embodiment.

Referring now to FIGS. 2 and 3, the core drill assembly 12 includes a drilling platform 20, a tower crane 22 supported on the drilling platform 20, and an ultrasonic drill 24 coupled to the tower crane 22. In general, the drilling platform 20 defines a frame or chassis of the core drill assembly 12 and includes a first end 26, an opposing second end 28, a first frame rail 30, and a second frame rail 32. The first frame rail 30 and the second frame rail 32 extend from the first end 26 to the second end 28 on laterally-opposing sides of the drilling platform 20. The first frame rail 30 and the second frame rail 32 angle laterally inward and meet at junction 34 at the first end 26 of the drilling platform 20. In some embodiments, a towing linkage or coupling is arranged at the junction 34 where the first frame rail 30 and the second frame rail 32 meet. For example, a towing ball or receiver, a pin and clevis hitch, or an equivalent towing coupling or linkage can be arranged at the junction 34. In general, the core drill assembly 12 is not self-propelled and is configured to be towed by the rover 14, which saves weight within the core drill assembly 12.

In the illustrated embodiment, the drilling platform 20 includes a plurality of wheels 36 rotatably coupled to the drilling platform 20, a guide plate 38, and a platform enclosure 40. In the illustrated embodiment, the drilling platform 20 includes four wheels 36, with two wheels 36 being coupled to the first frame rail 30 and two wheels being coupled to the second frame rail 32. In some embodiments, the drilling platform 20 can include more or less than four wheels 36.

The guide plate 38 extends laterally between the first frame rail 30 and the second frame rail 32 and is arranged adjacent to the second end 28. The guide plate 38 includes a plurality of guide holes 42 extending through the guide plate 38 and arranged in a array pattern. In the illustrated embodiment, the guide plate 38 includes twenty guide holes 42 arranged in a four-by-five rectangular array pattern. In some embodiments, the guide plate 38 can include more or less than twenty guide holes arranged in any array pattern (e.g., circular, triangular, etc.). In the illustrated embodiment, each of the guide holes 42 defines a generally circular shape and includes a keyed notch recess 44 that interrupts the circular profile of each of the guide holes 42. The platform enclosure 40 extends laterally between the first frame rail 30 and the second frame rail 32. In the illustrated embodiment, the tower crane 22 is coupled to and supported on a top surface of the platform enclosure 40. In general, the platform enclosure 40 encloses the electronic components of the core drill assembly 12 (see, e.g., FIG. 3).

In general, the ultrasonic drill 24 hangs from the tower crane 22 so that the ultrasonic drill 24 is configured to selectively move a vertical direction toward and away from the guide plate 38. In the illustrated embodiment, the tower crane 22 includes a mast 46 and a crane beam 48 coupled to a distal end of the mast 46. The crane beam 48 extends generally perpendicularly relative to the mast 46 and includes a drill carriage 50 that is linearly movable along the crane beam 48. For example, the core drill assembly 12 includes a carriage actuator 52 (e.g., an electromagnetic actuator, a linear actuator, etc.) that is coupled to the drill carriage 50 and configured to move the drill carriage 50 back and forth along the crane beam 48. The ultrasonic drill 24 is coupled to the drill carriage 50 by a wireline 54 that extends from within the drill carriage 50. In some embodiments, the wireline 54 provides power to the ultrasonic drill 24.

Figure 22:
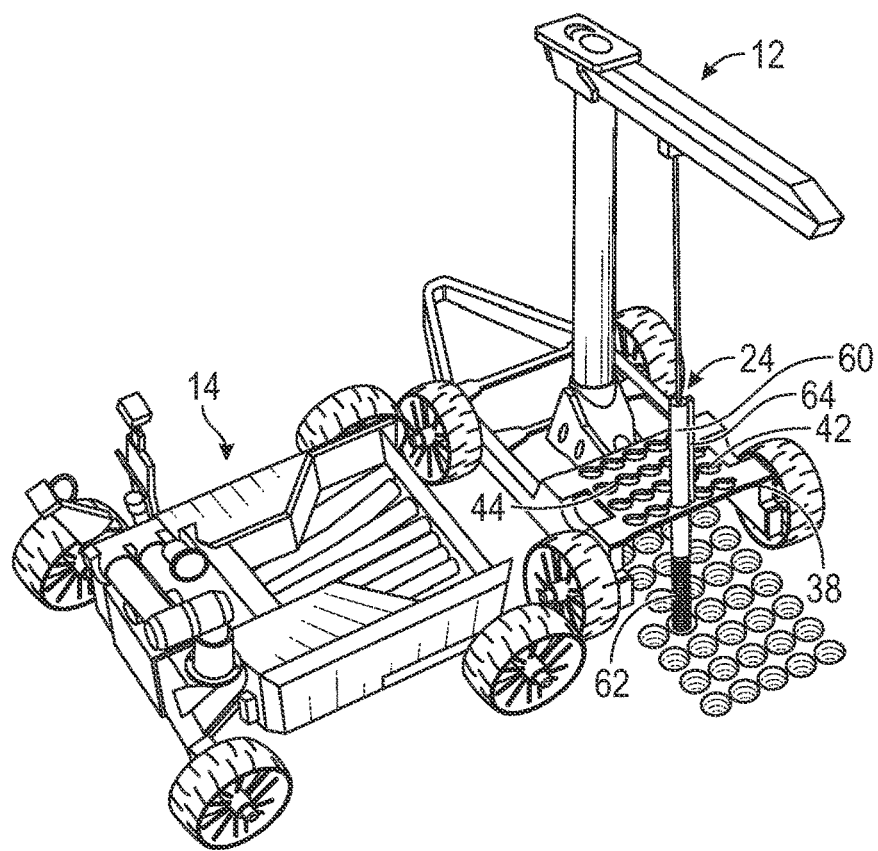
FIG. 22 is a perspective view of the drill assembly of FIG. 2 and the rover of FIG. 4 excavating a core sample from below a lunar surface at an excavation site, according to an exemplary embodiment.
Figure 23:
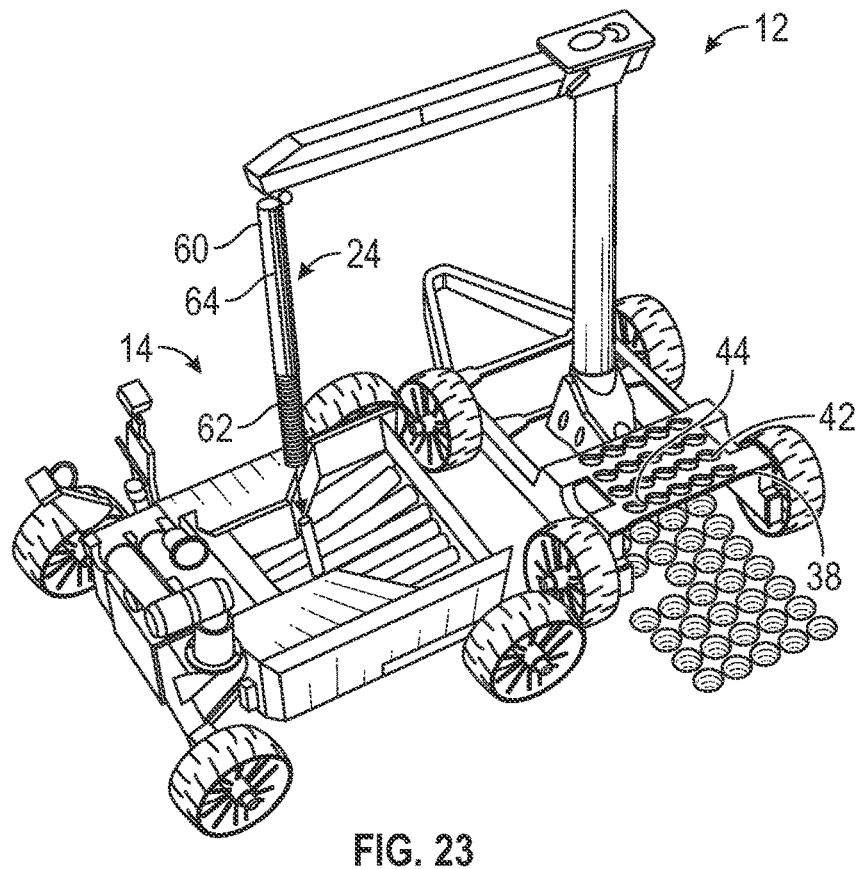
FIG. 23 is a perspective view of the drill assembly of FIG. 2 and the rover of FIG. 4 with a tower crane of the drill assembly rotated to deposit a core sample into the rover, according to an exemplary embodiment.

In some embodiments, the core drill assembly 12 includes a drill actuator 56 (e.g., an electromagnetic actuator, a linear actuator, a winch, etc.) that is coupled to the wireline 54 and configured to selectively move the ultrasonic drill 24 in a vertical direction toward and away from the guide plate 38. In some embodiments, the crane beam 48 is configured to rotate relative to the guide plate 38 (see, e.g., FIGS. 22 and 23). In some embodiments, the tower crane 22 includes a crane actuator 58 (e.g., an electromagnetic actuator, a rotary actuator, a motor, etc.) is that coupled to the crane beam 48 and configured to selectively rotate the crane beam 48 relative to the guide plate 38. In some embodiments, the crane actuator 58 is coupled to the mast 46 and the mast 46 and the crane beam 48 rotate together relative to the guide plate 38.

The ultrasonic drill 24 includes an outer casing 60 and a drill bit 62 that extends outwardly from a distal end of the outer casing 60. The outer casing 60 includes a keyed notch extension 64 (see, e.g., FIG. 22) that extends axially along a length of the outer casing 60. In general, the keyed notch extension 64 is designed to be received within the keyed notch recess 44 of the guide holes 42 so that the outer casing 60 is prevented from rotating. In this way, for example, the outer casing 60 is prevented from rotating and gives the ultrasonic drill 24 time to auger down during drilling and anchor itself prior to the outer casing 60 passing through the guide hole 42.

In some embodiments, the drill bit 62 is configured to rotate relative to the outer casing 60 and the drill bit 62 is also hammered at ultrasonic frequencies to achieve high regolith penetration rates while maintaining low energy usage. In some embodiments, the drill bit 62 is a sintered diamond bit that includes a plurality of layers of diamond throughout a metal matrix. As the metal matrix is worn away, new diamonds are exposed allowing consistent penetrations rates. The drill bit 62 includes external auger vanes 65 that, during drilling, are configured to direct a core sample from below the lunar surface into a collection pocket within the ultrasonic drill 24.

With specific reference to FIG. 3, the core drill assembly 12 includes the ultrasonic drill 24, the carriage actuator 52, the drill actuator 56, the crane actuator 58, a power supply 66, and a drill controller 68. In general, all of the electrical components of the core drill assembly 12, except the ultrasonic drill 24, are arranged within the platform enclosure 40 and a thermal management system 70 maintains the electrical components at a stable operating temperatures. In some embodiments, the thermal management system 70 includes one or more heaters that area selectively controlled, for example, by the drill controller 68 to maintain the stable operating temperatures. In some embodiments, the power supply 66 is a rechargeable battery that is arranged with the platform enclosure 40. In some embodiments, the power supply 66 is a rechargeable battery that is arranged externally from the core drill assembly 12, for example, a stand-alone battery pack installed at an excavation site. The power supply 66 is configured to supply electrical power to each of the ultrasonic drill 24, the carriage actuator 52, the drill actuator 56, the crane actuator 58, and the drill controller 68.

The drill controller 68 is in communication with the ultrasonic drill 24, the carriage actuator 52, the drill actuator 56, and the crane actuator 58. The drill controller 68 is configured to control the operation of each of the ultrasonic drill 24, the carriage actuator 52, the drill actuator 56, and the crane actuator 58. The drill controller 68 includes a processing circuit 71 having a processor 72 and memory 74. The processing circuit 71 can be communicably connected to a communications interface such that the processing circuit 71 and the various components thereof can send and receive data via the communications interface. The processor 72 can be implemented as a general purpose processor, an application specific integrated circuit ("ASIC"), one or more field programmable gate arrays ("FPGAs"), a group of processing components, or other suitable electronic processing components.

The memory 74 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. The memory 74 can be or include volatile memory or non-volatile memory. The memory 74 can include database components, object code components, script components, or any other type of information structure for supporting the various activities and information structures described in the present application. According to some embodiments, the memory 74 is communicably connected to the processor 72 via the processing circuit 71 and includes computer code for executing (e.g., by the processing circuit 71 and/or the processor 72) one or more processes described herein.

B. Rover

Figure 4:
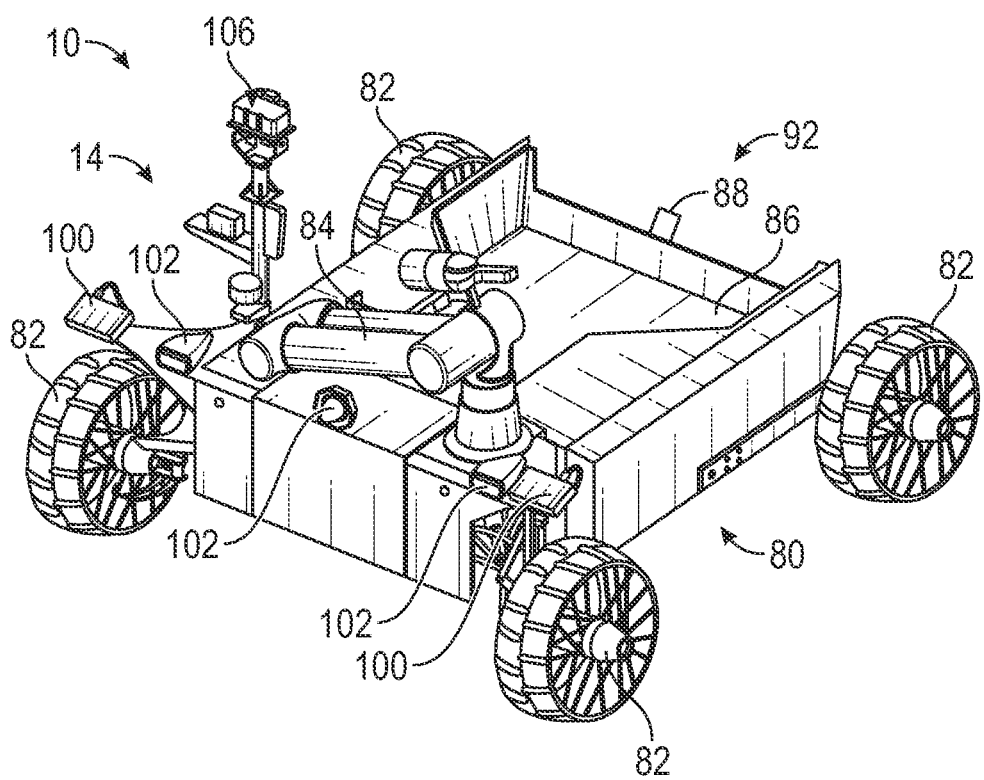
FIG. 4 is a perspective view of a rover of the lunar excavation and projectile transport system of FIG. 1, according to an exemplary embodiment.
Figure 5:
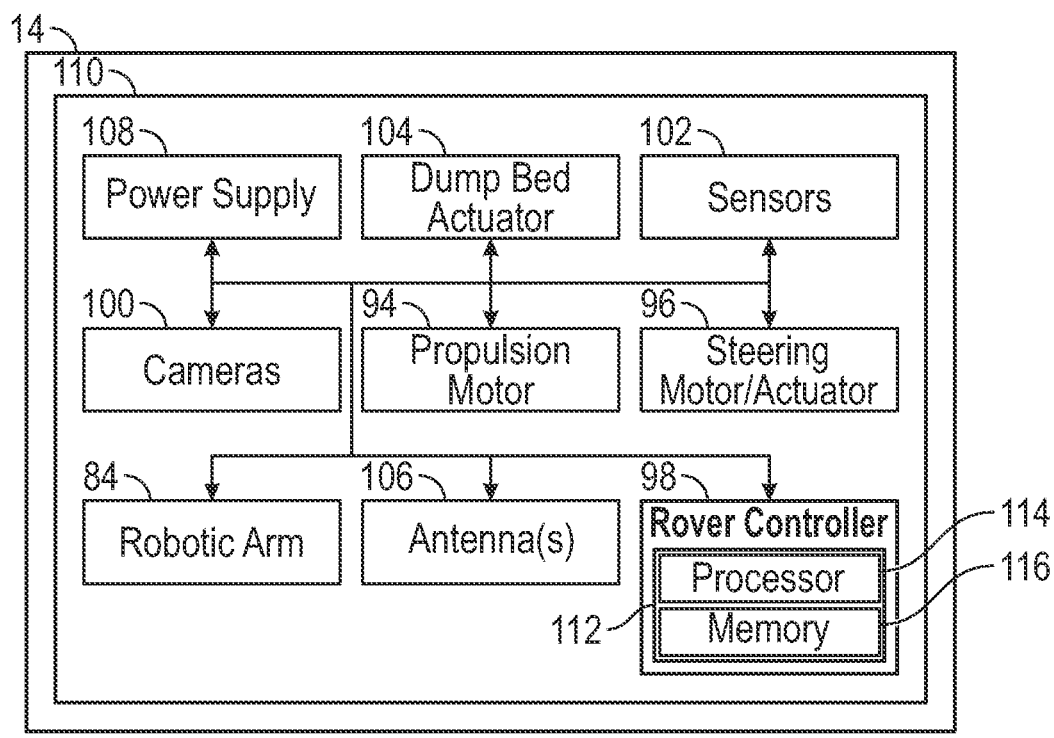
FIG. 5 is a block diagram of components of the rover of FIG. 4, according to an exemplary embodiment.

Referring now to FIGS. 4 and 5, the rover 14 includes a body 80, a plurality of rover wheels 82 rotationally coupled to the body 80, a robotic arm 84 coupled to the body 80, a dump bed 86 pivotally coupled to the body 80, and a towing hitch 88. The body 80 includes a first end 90 and an opposing second end 92. In the illustrated embodiment, the robotic arm 84 is coupled to the first end 90 of the body 80 and the dump bed 86 is coupled to the second end 92. In the illustrated embodiment, the rover 14 includes four wheels 82 rotationally coupled to the body 80. In some embodiments, the rover 14 can include more or less than four wheels 82.

In general, the rover 14 is self-propelled and includes a propulsion motor 94 (e.g., an electric motor) that is coupled to at least two of the wheels 82 and configured to drive the wheels 82 and propel the rover 14 at a predefined speed. The rover 14 includes a steering motor/actuator 96 that is coupled to at least two of the wheels 82 and configured to control a steering direction of the wheels 82 and, thereby, the steering direction of the rover 14. In some embodiments, each of the plurality of wheels 82 is coupled to the body 80 by an active suspension that is configured to selectively adjust an operating height of the body 80 and, thereby, an operating height of the robotic arm 84, the dump bed 86, and the towing hitch 88.

The robotic arm 84 is configured to move in three dimensions and can be manipulated either locally by a rover controller 98 or remotely by a user. In general, the rover 14 includes one or more cameras 100 and one or more sensors 102 that are used to detect and measure a position of the robotic arm 84 and to relay that information to the rover controller 98 and/or a remote user monitoring the position of the robotic arm 84. In some embodiments, the rover 14 includes at least three cameras 100 located adjacent to the robotic arm 84 to provide visibility of the robotic arm 84 from various viewpoints. The robotic arm 84 is configured to perform a variety of actions, for example, connecting power to wired equipment, manipulation and setup of equipment, and movement of core samples. In some embodiments, a distal end of the robotic arm 84 is equipped with one or more attachments (e.g., a scoop, a clasp or clamp, etc.).

Figure 17:
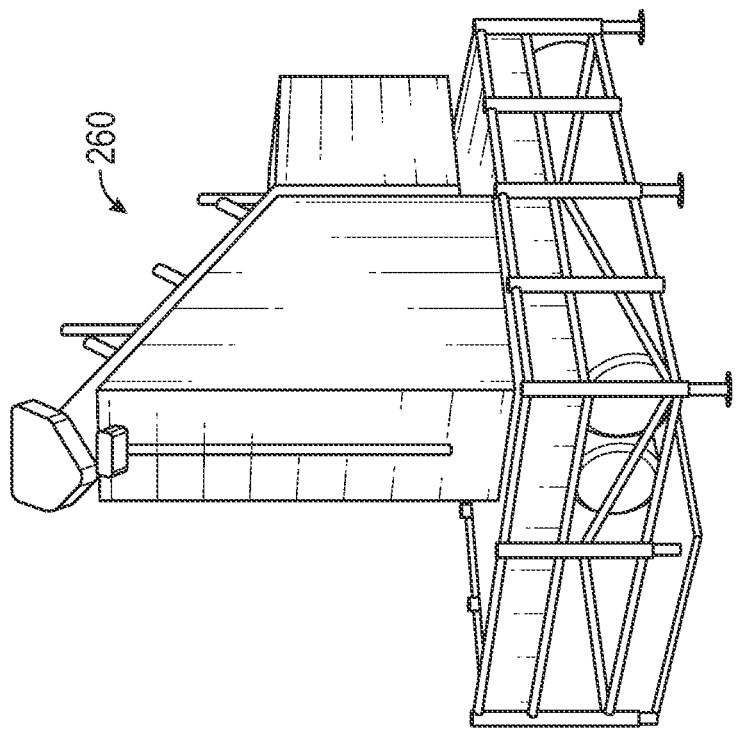
FIG. 17 is a perspective view of the rover of FIG. 4 carrying the projectile launcher of FIG. 6 to a processing plant, according to an exemplary embodiment.
Figure 17:
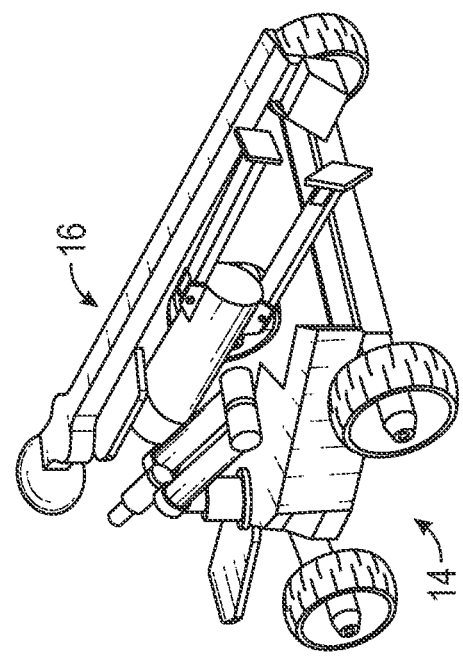
Figure 18:
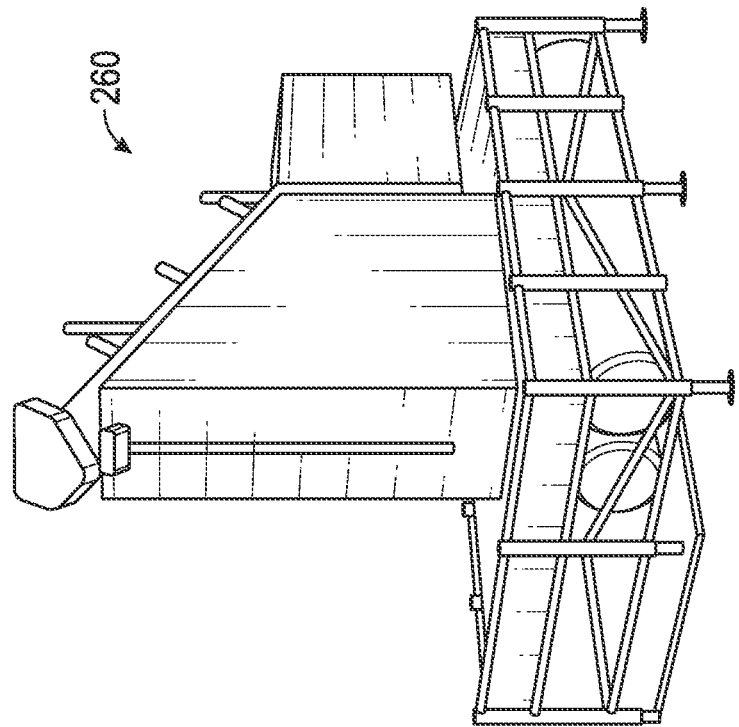
FIG. 18 is a perspective view of the rover of FIG. 4 deploying the projectile launcher of FIG. 6 near the processing plant, according to an exemplary embodiment.
Figure 18:
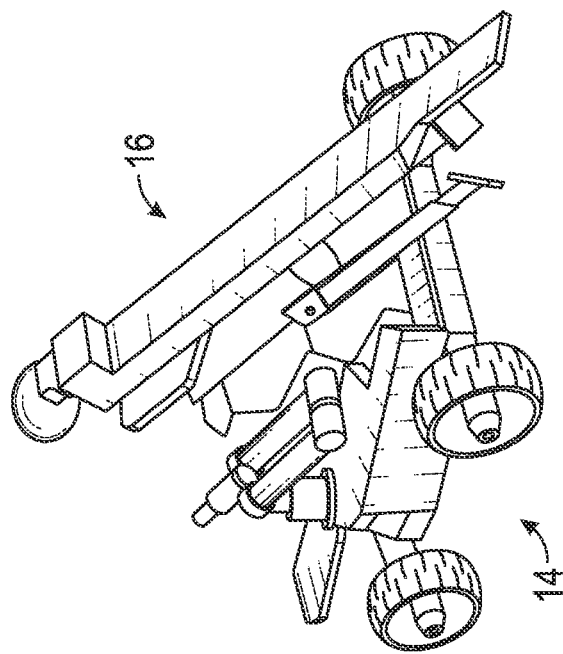
Figure 19:
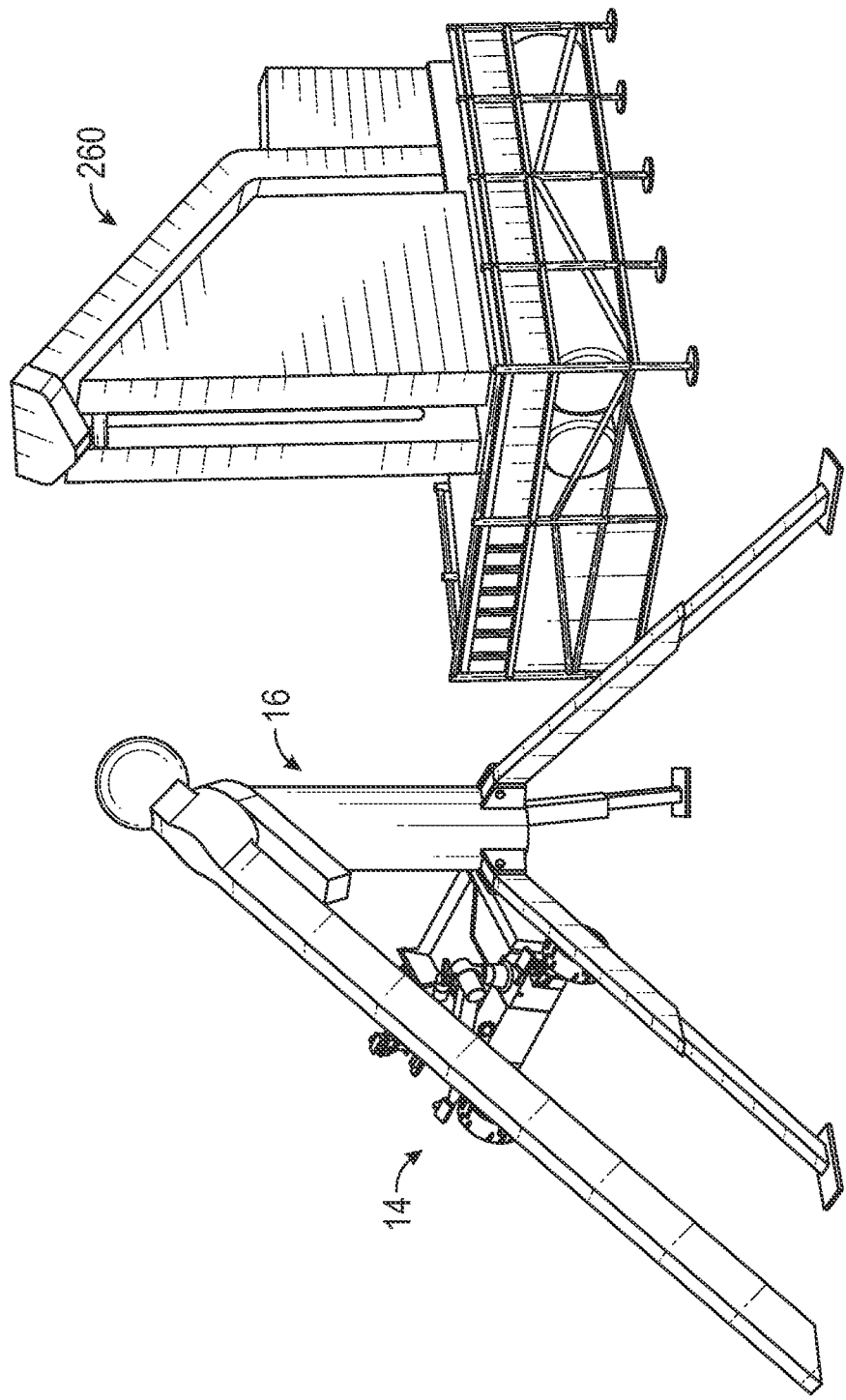
FIG. 19 is a perspective view of the rover of FIG. 4 and the projectile launcher of FIG. 6 with the projectile launcher deployed near the processing plant, according to an exemplary embodiment.
Figure 20:
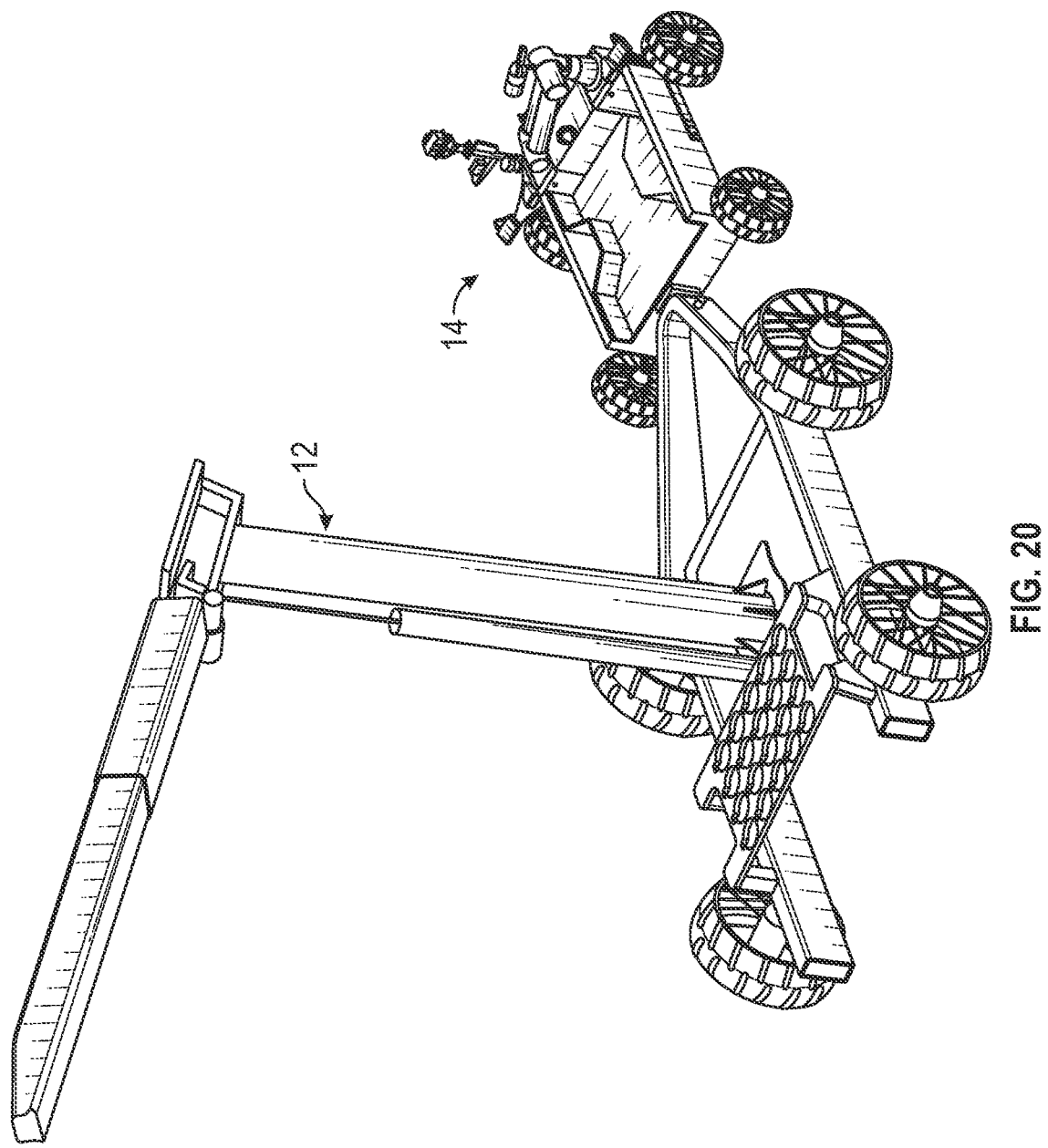
FIG. 20 is a perspective view of the rover of FIG. 4 towing the drill assembly of FIG. 2 to an excavation site, according to an exemplary embodiment.
Figure 21:
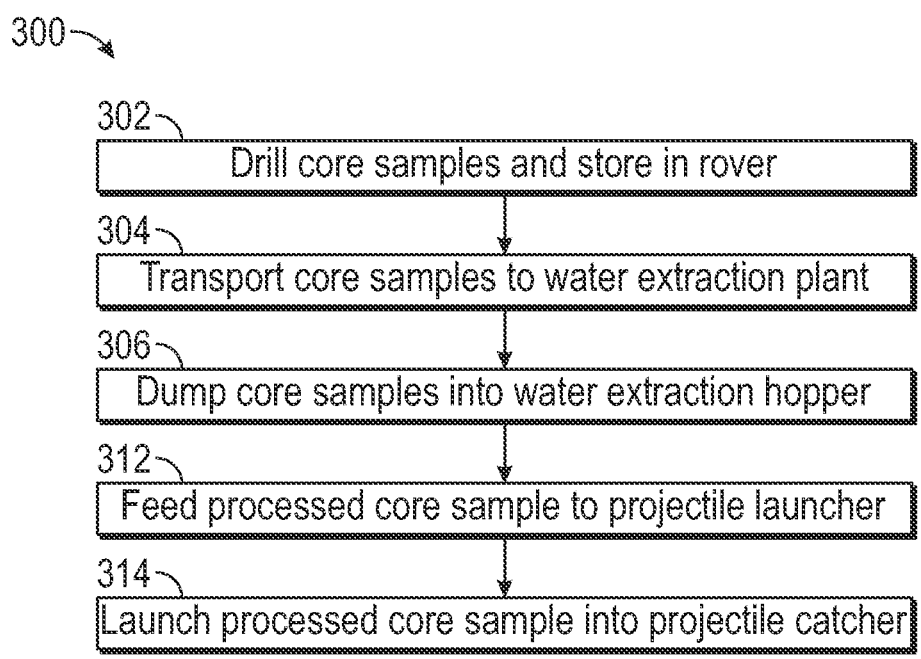
FIG. 21 is a block diagram outlining the steps in a method for excavating and transporting icy regolith, according to an exemplary embodiment.
Figure 24:
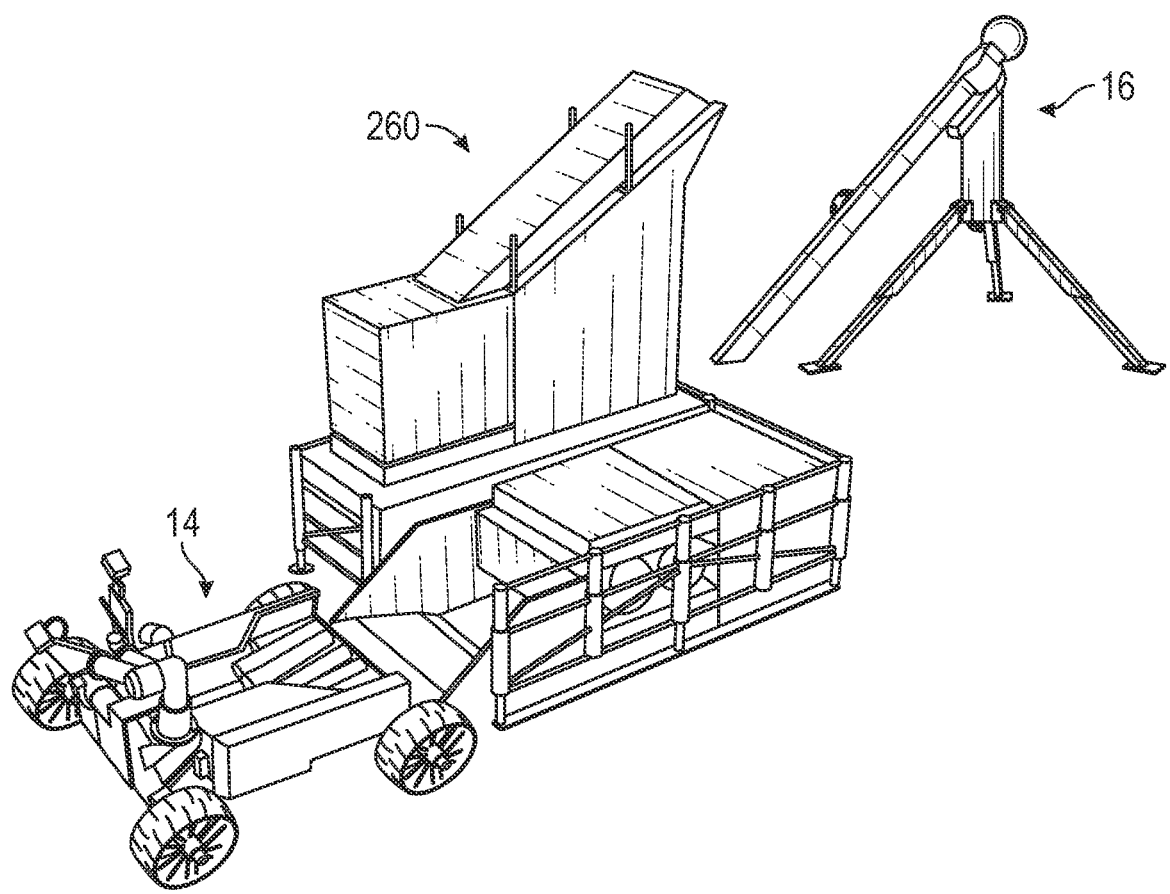
FIG. 24 is a perspective view of the rover of FIG. 4 backed up to a hopper of a processing plant and a dump bed in a stowed position, according to an exemplary embodiment.
Figure 25:
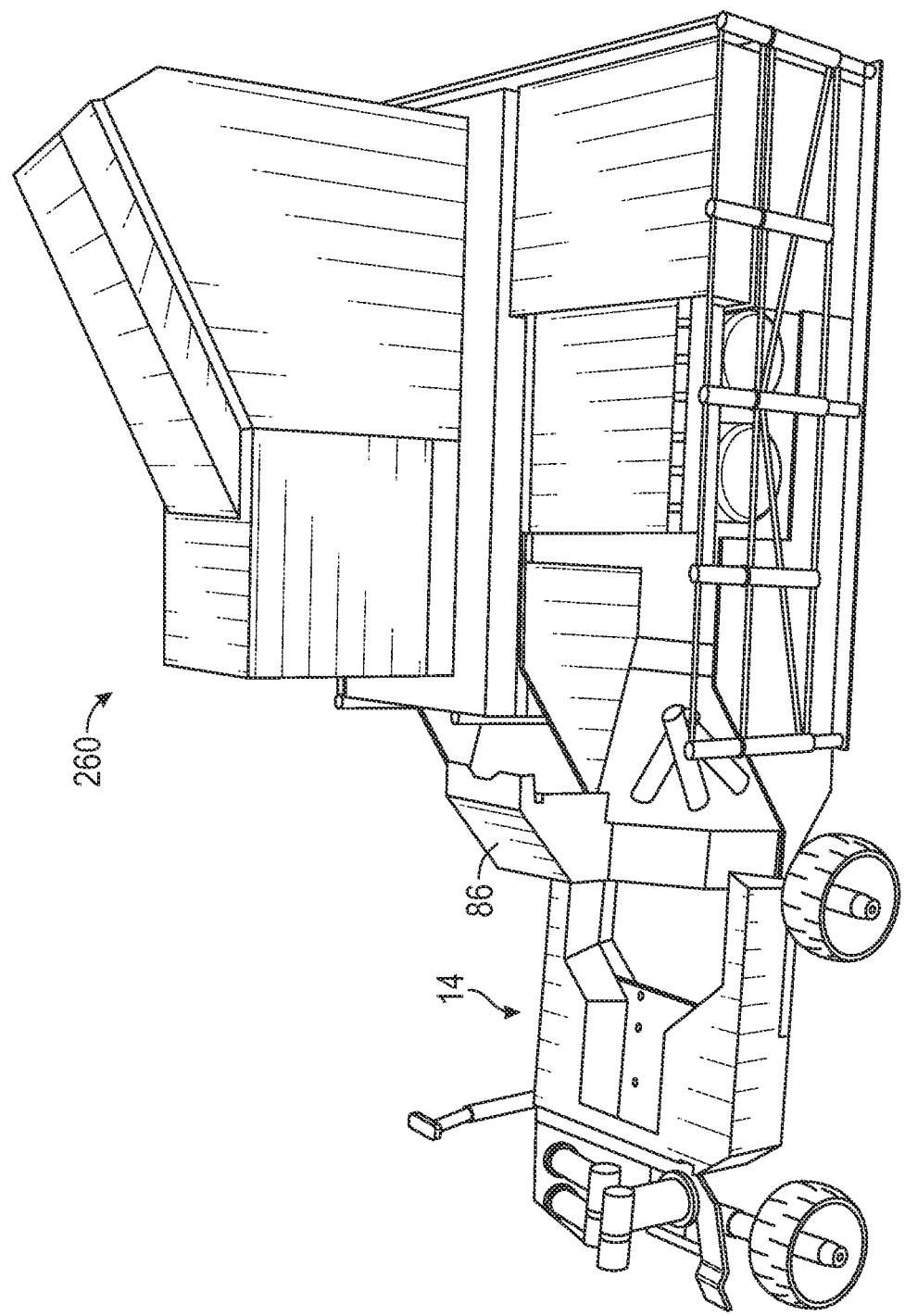
FIG. 25 is a perspective view of the rover of FIG. 4 backed up to a hopper of a processing plant and a dump bed in a dump position, according to an exemplary embodiment.
Figure 26:
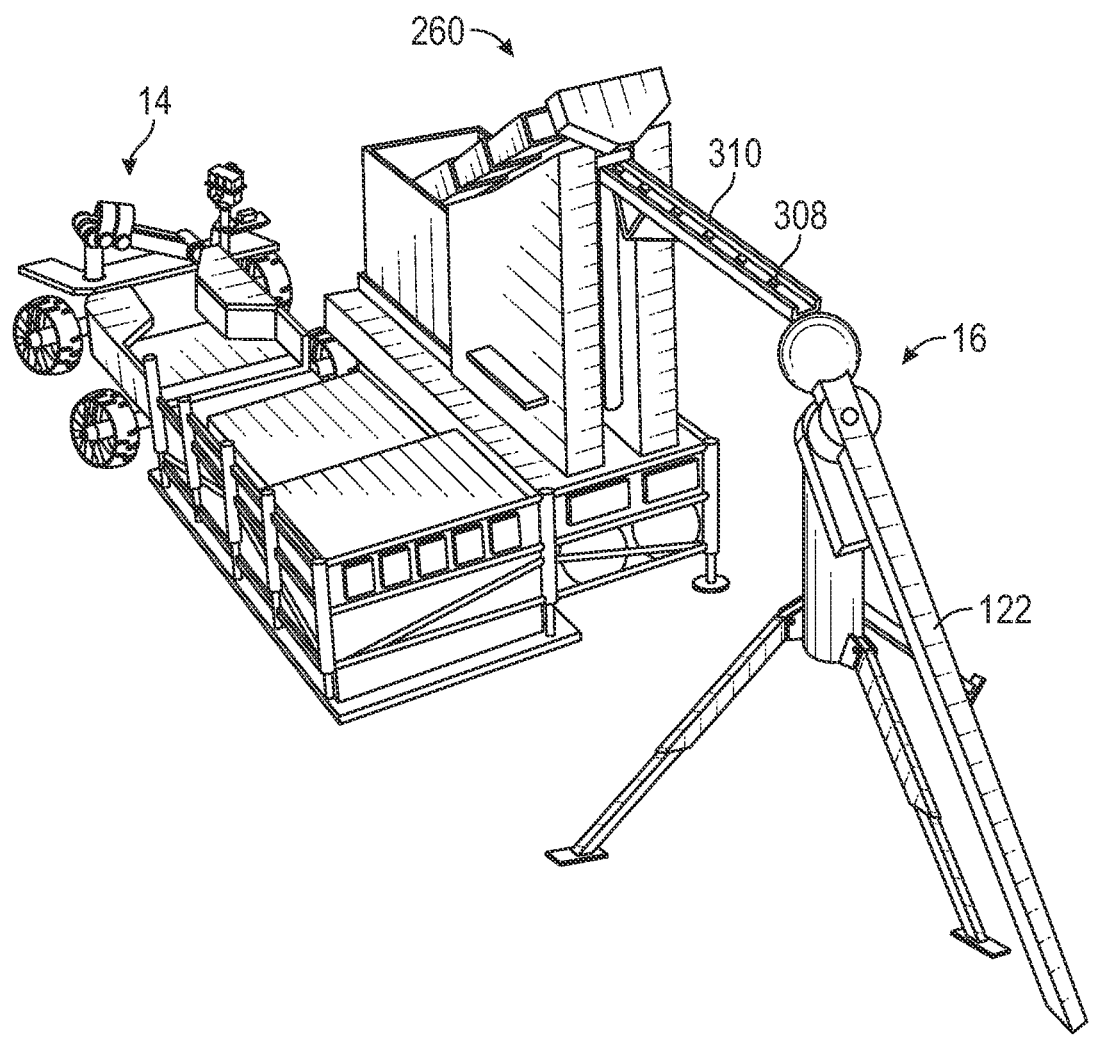
FIG. 26 is a perspective view of the projectile launcher of FIG. 6 receiving processed core samples from a processing plant, according to an exemplary embodiment.
Figure 27:
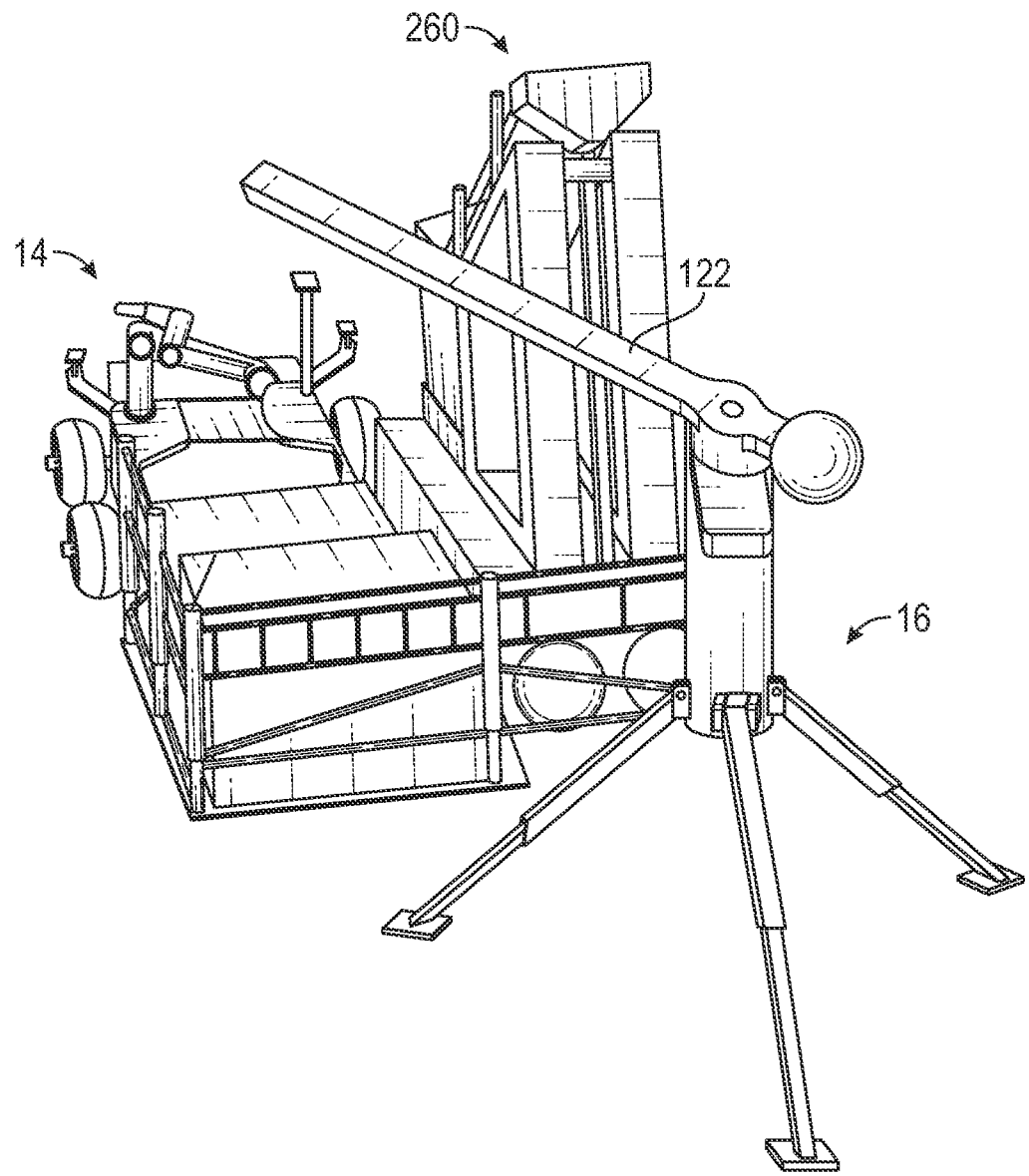
FIG. 27 is a perspective view of the projectile launcher of FIG. 6 rotating with processed core samples within a throwing arm, according to an exemplary embodiment.
Figure 28:
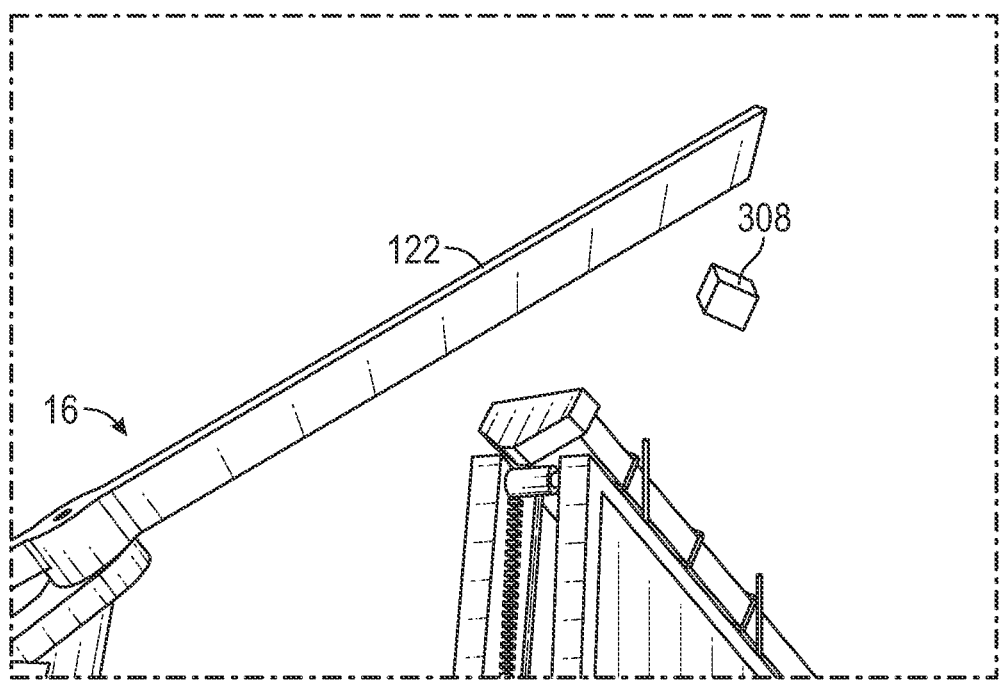
FIG. 28 is a perspective view of the projectile launcher of FIG. 6 launching a processed core sample from a throwing arm, according to an exemplary embodiment.
Figure 29:
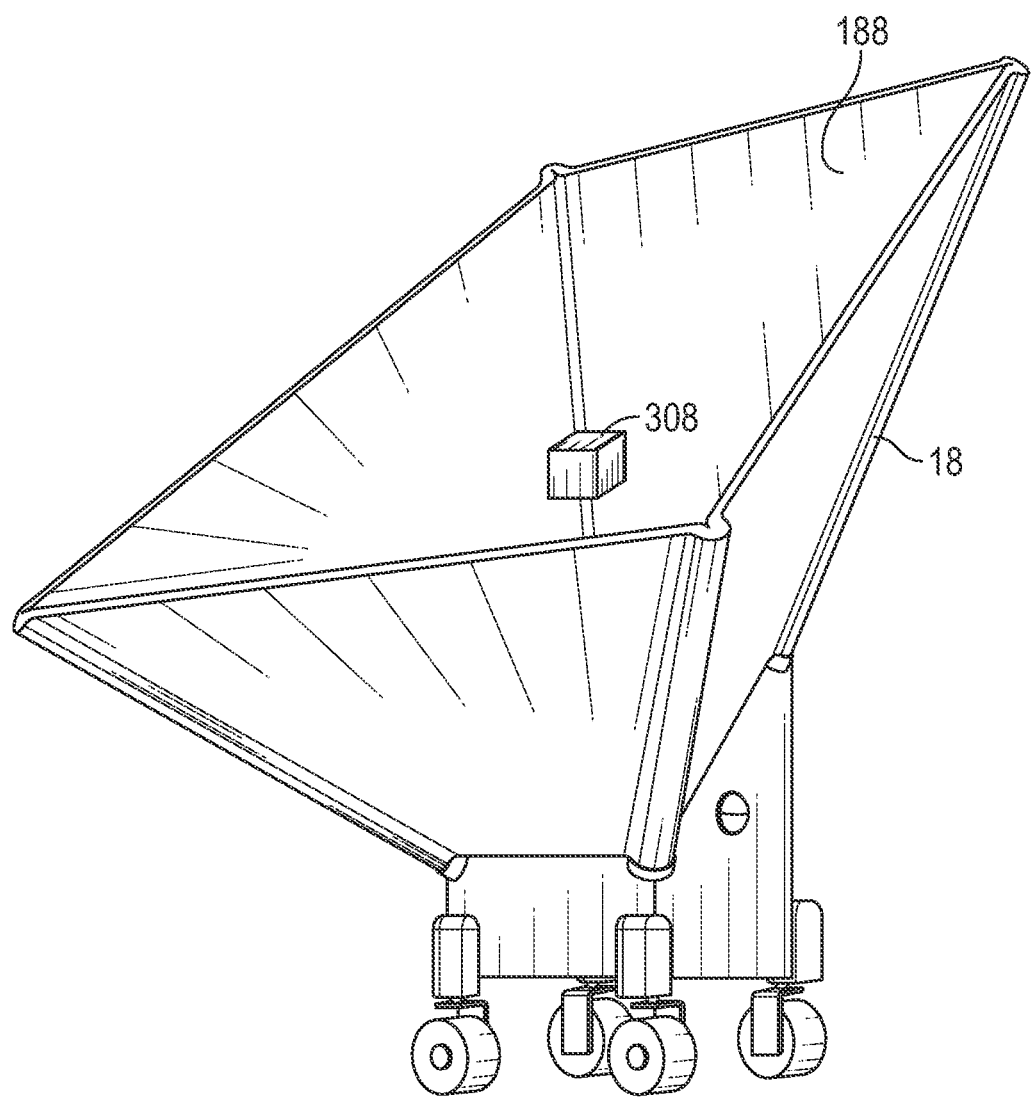
FIG. 29 is a perspective view of the projectile catcher of FIG. 13 catching a processed core sample, according to an exemplary embodiment.

The dump bed 86 defines a cavity within which equipment (e.g., the projectile launcher 16) and/or core samples are stored and transported between locations. The dump bed 86 is coupled to a dump bed actuator 104 (e.g., an electromagnetic actuator, a linear actuator, etc.) that is configured to selectively move the dump bed 86 between a stowed position (see, e.g., FIGS. 4, 17, and 24) and a dump position (see, e.g., FIGS. 18 and 25). In the stowed position, the dump bed 86 is arranged generally flush with the body 80 (e.g., generally parallel with a ground on which the rover 14 travels). In the dump position, the dump bed actuator 104 pivots the dump bed 86 upwardly away from the body 80 to a position where the dump bed 86 is arranged about perpendicular to the ground on which the rover 14 travels. The dump bed actuator 104 is configured to pivot the dump bed 86 to any position between the stowed position and the dump position.

In some embodiments, the towing hitch 88 is arranged at the second end 92 of the body 80. In some embodiments, the towing hitch 88 is attached to an end of the dump bed 86 so that the towing hitch 88 pivots with the dump bed 86 to facilitate latching and unlatching the towing hitch 88 to and from various components. In some embodiments, the towing hitch 88 includes a towing ball or receiver, a pin and clevis hitch, or an equivalent towing coupling or linkage.

In general, the rover 14 includes the rover controller 98, the one or more cameras 100, the one or more sensors 102, and an antenna 106, which all coordinate to enable various modes of operation. For example, the rover 14 is configured to operate in an autonomous mode where the rover controller 98 navigates the rover 14 and controls the operation of the robotic arm 84 and the dump bed 86. In some embodiments, the rover 14 is operable in a semi-autonomous mode where a remote user controls operation of one of the rover 14 navigation or the robotic arm 84. In some embodiments, the rover 14 is operable in a manual mode where a remote user controls all operations of the rover 14.

In some embodiments, the rover controller 98, the one or more cameras 100, the one or more sensors 102, and the antenna 106 comprise an autonomous kit that includes communication networks, sensing systems, software, and autonomous controls for steering, braking, and throttle. In some embodiments, the one or more sensors 102 include at least one LIDAR sensor and at least one radar sensor. The use of at least one LIDAR sensor and at least one radar sensor enable the rover 14 to autonomously operate and navigate in high-contrast and/or dark environments (e.g., in a PSR). In some embodiments, at least one LIDAR sensor and the at least one radar sensor are leveraged by the rover controller 98 to develop a three-dimensional model of terrain features and measure path widths, slopes, and grades, as well as clearance to obstacles and infrastructure. The rover controller 98 is configured to communicate with Earth-based operations using the antenna 106 and a satellite or relay structure present on the lunar surface. The rover controller 98 is also configured to communicate with the core drill assembly 12, the projectile launcher 16, and the projectile catcher 18.

With specific reference to FIG. 5, the rover 14 includes a power supply 108 that is configured to supply electrical power to the robotic arm 84, the propulsion motor 94, the steering motor/actuator 96, the rover controller 98, the one or more cameras 100, the one or more sensors 102, the dump bed actuator 104, and the antenna 106. In some embodiments, the power supply 108 is a rechargeable battery that is enclosed within the body 80. In some embodiments, a thermal management system 110 monitors a temperature of all the electronic components of the rover 14 and includes heaters to maintain the electrical components at a stable operating temperature. In some embodiments, the heaters are actively controlled by the rover controller 98.

The rover controller 98 is in communication with the robotic arm 84, the propulsion motor 94, the steering motor/actuator 96, the one or more cameras 100, the one or more sensors 102, the dump bed actuator 104, and the antenna 106. The rover controller 98 is configured to control the operation of each of the robotic arm 84, the propulsion motor 94, the steering motor/actuator 96, the one or more cameras 100, the one or more sensors 102, the dump bed actuator 104, and the antenna 106. The rover controller 98 includes a processing circuit 112 having a processor 114 and memory 116. The processing circuit 112 can be communicably connected to a communications interface such that the processing circuit 112 and the various components thereof can send and receive data via the communications interface. The processor 114 can be implemented as a general purpose processor, an application specific integrated circuit ("ASIC"), one or more field programmable gate arrays ("FPGAs"), a group of processing components, or other suitable electronic processing components.

The memory 116 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. The memory 116 can be or include volatile memory or non-volatile memory. The memory 116 can include database components, object code components, script components, or any other type of information structure for supporting the various activities and information structures described in the present application. According to some embodiments, the memory 116 is communicably connected to the processor 114 via the processing circuit 112 and includes computer code for executing (e.g., by the processing circuit 112 and/or the processor 114) one or more processes described herein.

C. Projectile Launcher

Figure 6:
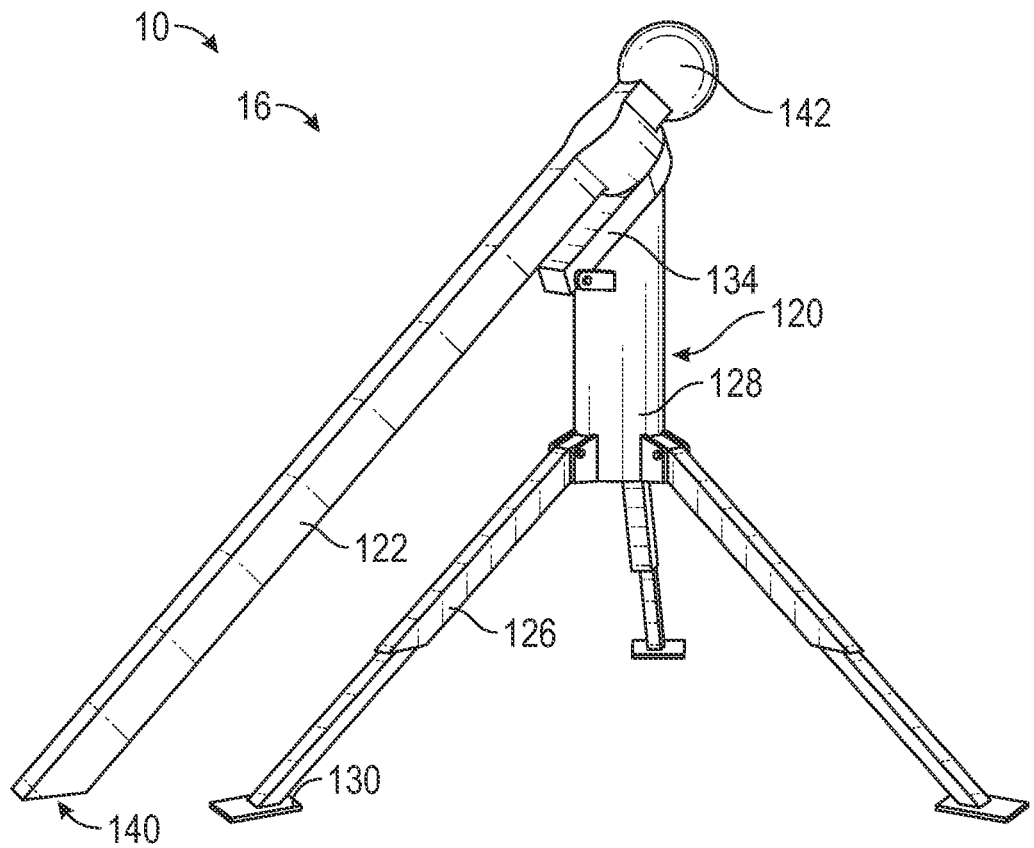
FIG. 6 is a perspective view of a projectile launcher of the lunar excavation and projectile transport system of FIG. 1, according to an exemplary embodiment.
Figure 7:
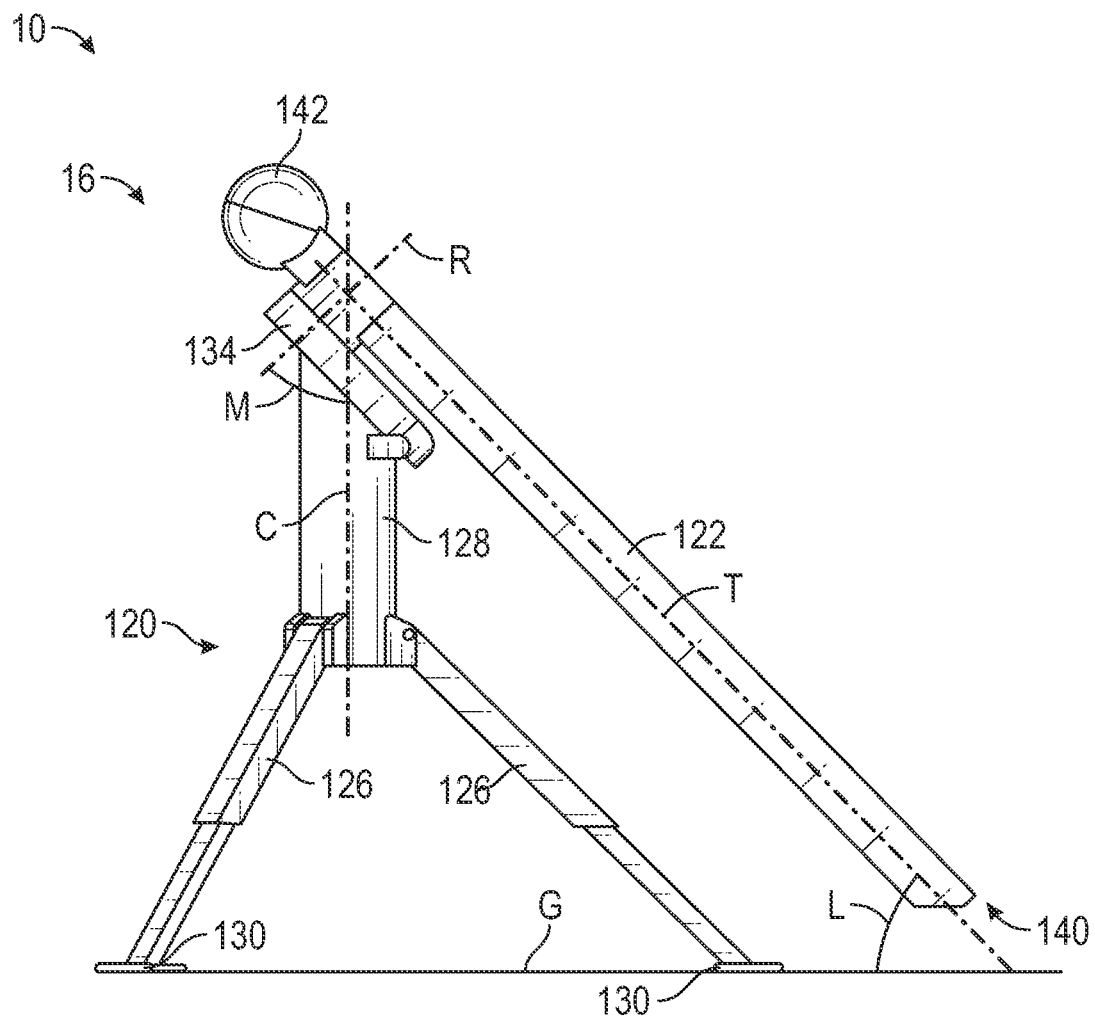
FIG. 7 is a side view of the projectile launcher of FIG. 6.
Figure 8:
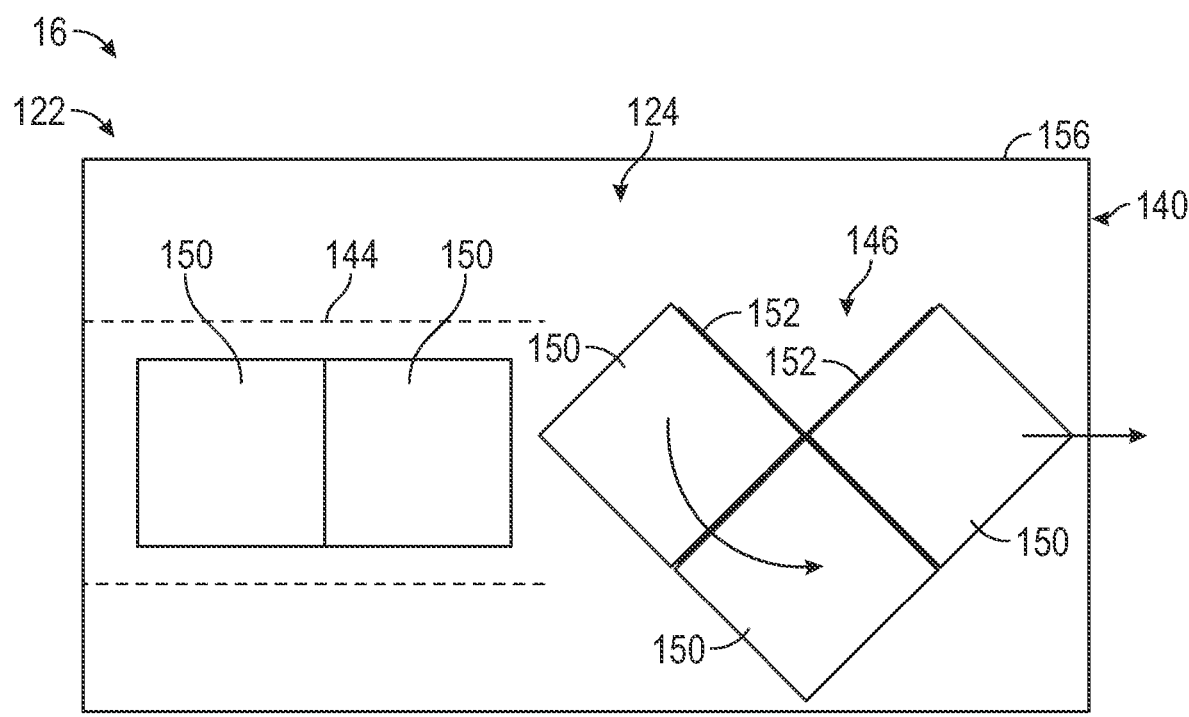
FIG. 8 is a schematic illustration of a release mechanism of the projectile launcher of FIG. 6, according to an exemplary embodiment.
Figure 10:
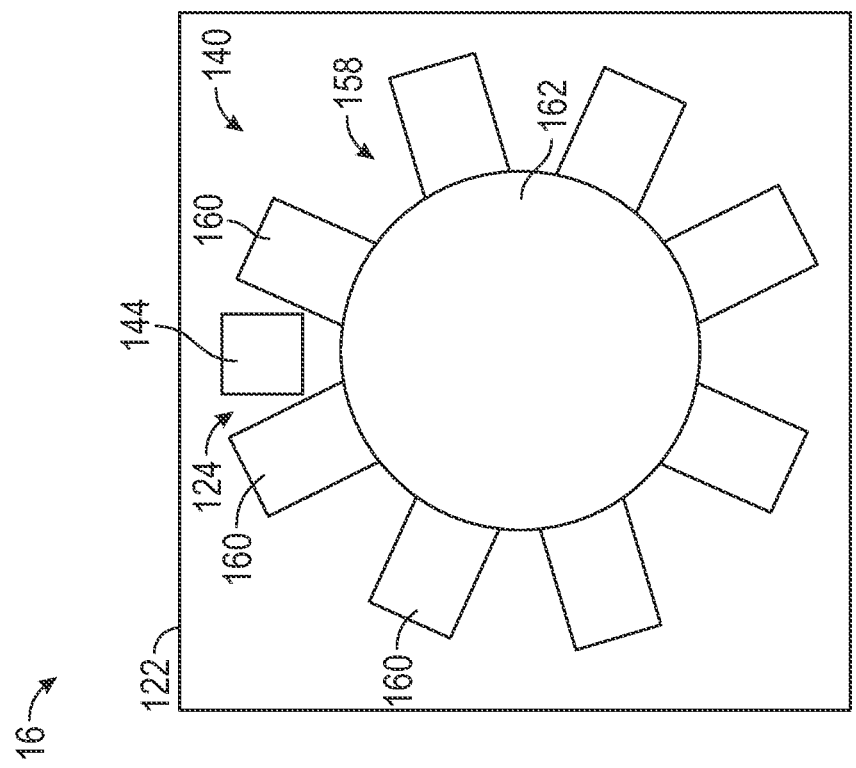
FIG. 10 is a schematic illustration of the release mechanism of FIG. 9 with the release mechanism in a unblocked position.
Figure 9:
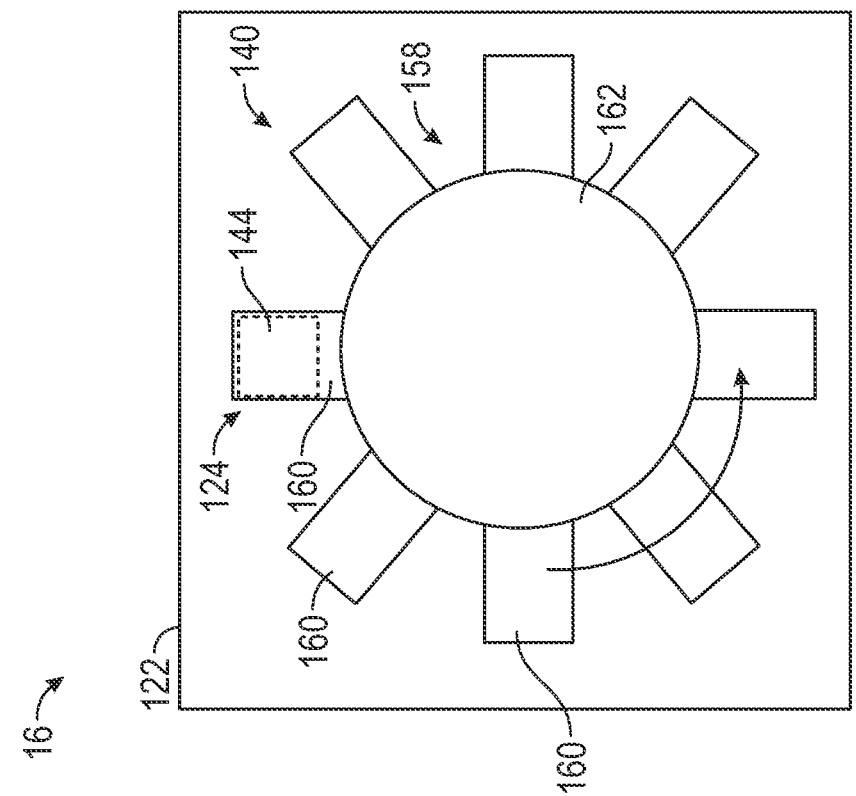
FIG. 9 is a schematic illustration of a release mechanism of the projectile launcher of FIG. 6 with the release mechanism in a blocked position, according to another exemplary embodiment.
Figure 11:
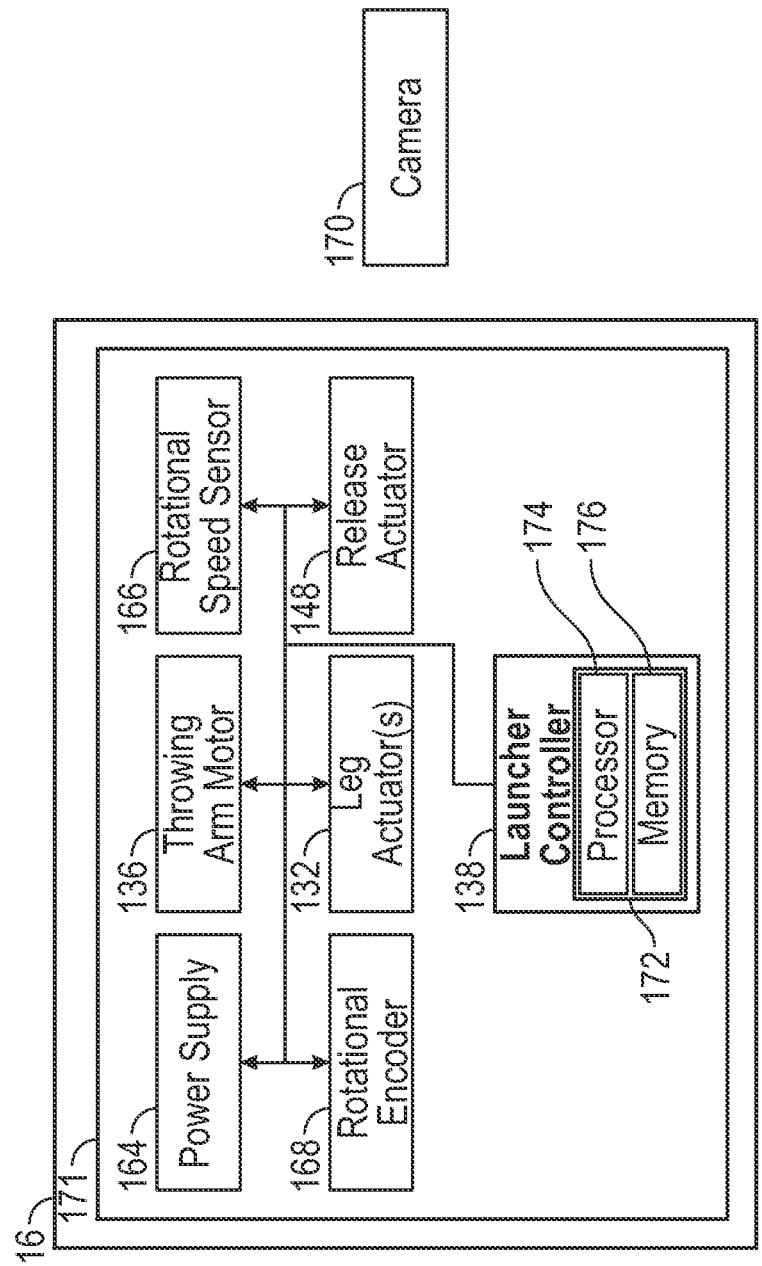
FIG. 11 is a block diagram of components of the projectile launcher of FIG. 6, according to an exemplary embodiment.

Referring now to FIGS. 6-8, the projectile launcher 16 includes a base 120, a throwing arm 122, and a release mechanism 124 (see, e.g., FIGS. 9-11). The base 120 includes a plurality of legs 126 and a cylindrical portion 128. Each of the plurality of legs 126 is rotatably coupled to the cylindrical portion 128 and includes a ground pad 130 upon which the projectile launcher 16 is supported in a deployed configuration (e.g., the projectile launcher 16 is standing on a lunar surface). In some embodiments, each of the plurality of legs 126 is a telescoping leg that is coupled to a leg actuator 132 (e.g., an electromagnetic actuator, a linear actuator, etc.). The leg actuators 132 are configured to selectively adjust an operating height of the throwing arm 122.

The throwing arm 122 is rotatably coupled to the base 120 so that the throwing arm 122 is arranged at a predefined mounting angle M relative to a central axis C defined by the cylindrical portion 128 of the base 120. In the illustrated embodiment, a motor coupling 134 is coupled to a distal end of the cylindrical portion 128. The motor coupling 134 includes a throwing arm motor 136 (e.g., an electric motor) that is coupled to the throwing arm 122. The motor coupling 134 arranges the throwing arm 122 at the mounting angle M, which defines a launch angle L for the throwing arm 122. The mounting angle M is defined as the angle between the central axis C and a rotational axis R defined by the throwing arm 122. The launch angle L is defined as the angle between a central axis T of the throwing arm 122 and a ground G on which the projectile launcher 16 stands.

Due to the geometry of the base 120, the mounting angle M is equal to the launch angle L and, therefore, the design of the base 120 and the motor coupling 134 fix the launch angle L for the throwing arm 122. In general, a rotational speed of the throwing arm 122, the launch angle L, and a release point from the throwing arm 122 define a trajectory traversed by a processed core sample that is launched from within the throwing arm 122 during rotation of the throwing arm 122 by the throwing arm motor 136. With the launch angle L fixed by the geometry of the base 120 and the motor coupling 134, the rotational speed of the throwing arm 122 is selectively controlled (e.g., by a launcher controller 138). If necessary, a height of the launch point can be adjusted by the leg actuators 132. As such, the launch conditions of a processed core sample being launched from the throwing arm 122 are known and the trajectory of the processed core sample is calculated based on the gravitational and friction (e.g., drag) conditions on the lunar surface. In some embodiments, the base 120 and the throwing arm 122 are fabricated from a fiber-reinforced composite material that act to minimize weight and maximize area moment of inertia.

In some embodiments, the motor coupling 134 is rotationally coupled to the cylindrical portion 128 of the base 120 so that the throwing arm 122 and the motor coupling 134 pivot relative to the cylindrical portion 128. In this way, for example, the throwing arm 122 can transition to a stowed position for transport in the rover 14. In the illustrated embodiment, the throwing arm 122 includes an outlet end 140 and a counterweight 142 arranged at an opposite end of the throwing arm 122. In general, the processed core samples are launched from the outlet end 140 of the throwing arm 122. The counterweight 142 balances the mass of the throwing arm 122 and the processed core samples arranged therein to generally focus a center of gravity defined by the projectile launcher 16 over the central axis C. In some embodiments, a channel 144 (see, e.g., FIGS. 9-11) extends through the throwing arm 122 from the outlet end 140 to a distal end of the counterweight 142. In this way, for example, processed core samples can be loaded into the channel 144 through the counterweight 142 and gravity-fed toward the outlet end 140.

In general, the release mechanism 124 is arranged within the throwing arm 122 adjacent to the outlet end 140 and is configured to selectively move between a blocked state where the release mechanism 124 blocks a processed core sample from being launched from the throwing arm 122 and an unblocked state where the release mechanism 124 unblocks a processed core sample and allows the processed core sample to be launched from the throwing arm 122. In some embodiments, the release mechanism 124 includes protrusion that is configured to selectively unblock a processed core sample to launch the processed core sample from the throwing arm 122. In some embodiments, the release mechanism 124 includes a notched wheel or gear that is selectively rotated to unblock a processed core sample.

With specific reference to FIG. 8, in some embodiments, the release mechanism 124 includes a notched wheel or gear 146 that is coupled to a release actuator 148 (e.g., an electromagnetic actuator, a rotary actuator, etc.). The release actuator 148 (see, e.g., FIG. 11) is configured to selectively rotate the notched wheel 146 and unblock a processed core sample 150 within the outlet end 140 of the throwing arm 122. In the illustrated embodiment, the notched wheel 146 includes a plurality of notches or protrusions 152 that form a crisscross pattern to define four chambers 154 within which a processed core sample 150 can be received. For example, the processed core samples 150 are fed into the channel 144 and the rotational inertia generated by rotating the throwing arm 122 forces a processed core sample 150 into the chamber 154 directly facing the processed core sample 150. Upon rotation of the notched wheel 146 in a predefined increment (e.g., 90°), the processed core sample 150 is rotated to a position where it is arranged within a predefined clearance of an internal sidewall 156 in the outlet end 140 of the throwing arm 122, and another processed core sample 150 within the channel 144 is fed into the next open chamber 154. The processed core sample 150 arranged adjacent to the internal sidewall 156 is prevented or blocked from exiting the outlet end 140 of the throwing arm 122.

Once the notched wheel 146 is rotated again in the predefined increment, the processed core sample 150 arranged adjacent to the internal sidewall 156 is rotated to an unblocked state where it is free to be launched from the outlet end 140 of the throwing arm 122. The processed core sample 150 that was newly loaded into a chamber 154 is now arranged adjacent to the internal sidewall 156 and another processed core sample 150 is fed into the next open chamber 154. The process of rotating the notched wheel 146 can be repeated until a particular number of processed core samples 150 are launched, or until the channel 144 is empty.

With specific reference to FIGS. 9 and 10, in some embodiments, the release mechanism 124 includes a notched wheel or gear 158 that includes a plurality or protrusions or spurs/teeth 160 that extend radially outwardly from a central hub 162. In general, the gear 158 is designed so that the spacing between the protrusions 160 is dimensioned to allow a processed core sample to pass between adjacent protrusions 160 and launch from the channel 144. In addition, the protrusions 160 are designed so that a thickness of the protrusions 160 is dimensioned to block or prevent a processed core sample from leaving the channel 144. The gear 158 is coupled to the release actuator 148 so that the release actuator 148 selectively rotates the gear 158 and the plurality protrusions 160 between a blocked state (FIG. 9) where the channel 144 and the processed core samples arranged therein are blocked and prevented from launching from throwing arm 122 and an unblocked state (FIG. 10) where the channel 144 is unblocked and a processed core sample is allowed to be launched from the throwing arm 122. The speed at which the release actuator 148 rotates the gear 158 is controlled to only allow a single processed core sample to be launched from the throwing arm 122 before the next protrusion 160 rotates in front of the channel 144 and returns to the blocked state.

Turning to FIG. 11, the projectile launcher 16 includes a power supply 164 that is configured to supply electrical power to the leg actuators 132, the throwing arm motor 136, the launcher controller 138, the release actuator 148, a rotational speed sensor 166, and a rotational encoder 168. In some embodiments, the power supply 164 is a rechargeable battery that is arranged with the base 120. In some embodiments, the power supply 164 is a rechargeable battery that is arranged externally from the projectile launcher 16, for example, a stand-alone battery pack installed at a processing site or attached to a processing plant.

The rotational speed sensor 166 is coupled to the throwing arm motor 136 and is configured to measure the rotational seed thereof. With the distance between the rotational axis R and the outlet end 140 being fixed, the rotational speed of the outlet end 140, where the processed core samples are launched from, is calculated and monitored by the launcher controller 138. The rotational encoder 168 is coupled to the throwing arm motor 136 and is configured to measure a rotational position of the throwing arm 122. The data from the rotational speed sensor 166, the rotational encoder 168, and the leg actuators 132 (e.g., operational height of the throwing arm 122) provides the launcher controller 138 with all the inputs required to control a trajectory of a processed core sample that is launched by the throwing arm 122. In some embodiments, a camera 170 (e.g., a high-speed camera) is arranged to image a launch position of the processed core samples being launched by the throwing arm 122 to provide feedback and verification of the planned trajectory. In some embodiments, the camera 170 is positioned on a processing plant or another structure mounted near the projectile launcher 16. In some embodiments, a thermal management system 171 maintains the electrical components of the projectile launcher 16 at a stable operating temperatures. In some embodiments, the thermal management system 171 includes one or more heaters that are selectively controlled, for example, by the launcher controller 138 to maintain the stable operating temperatures.

The launcher controller 138 is in communication with the leg actuators 132, the throwing arm motor 136, the release actuator 148, the rotational speed sensor 166, and the rotational encoder 168. The launcher controller 138 is configured to control operation of each of the leg actuators 132, the throwing arm motor 136, the release actuator 148. The launcher controller 138 includes a processing circuit 172 having a processor 174 and memory 176. The processing circuit 172 can be communicably connected to a communications interface such that the processing circuit 172 and the various components thereof can send and receive data via the communications interface. The processor 174 can be implemented as a general purpose processor, an application specific integrated circuit ("ASIC"), one or more field programmable gate arrays ("FPGAs"), a group of processing components, or other suitable electronic processing components.

The memory 176 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. The memory 176 can be or include volatile memory or non-volatile memory. The memory 176 can include database components, object code components, script components, or any other type of information structure for supporting the various activities and information structures described in the present application. According to some embodiments, the memory 176 is communicably connected to the processor 174 via the processing circuit 172 and includes computer code for executing (e.g., by the processing circuit 172 and/or the processor 174) one or more processes described herein.

D. Projectile Catcher

Figure 12:
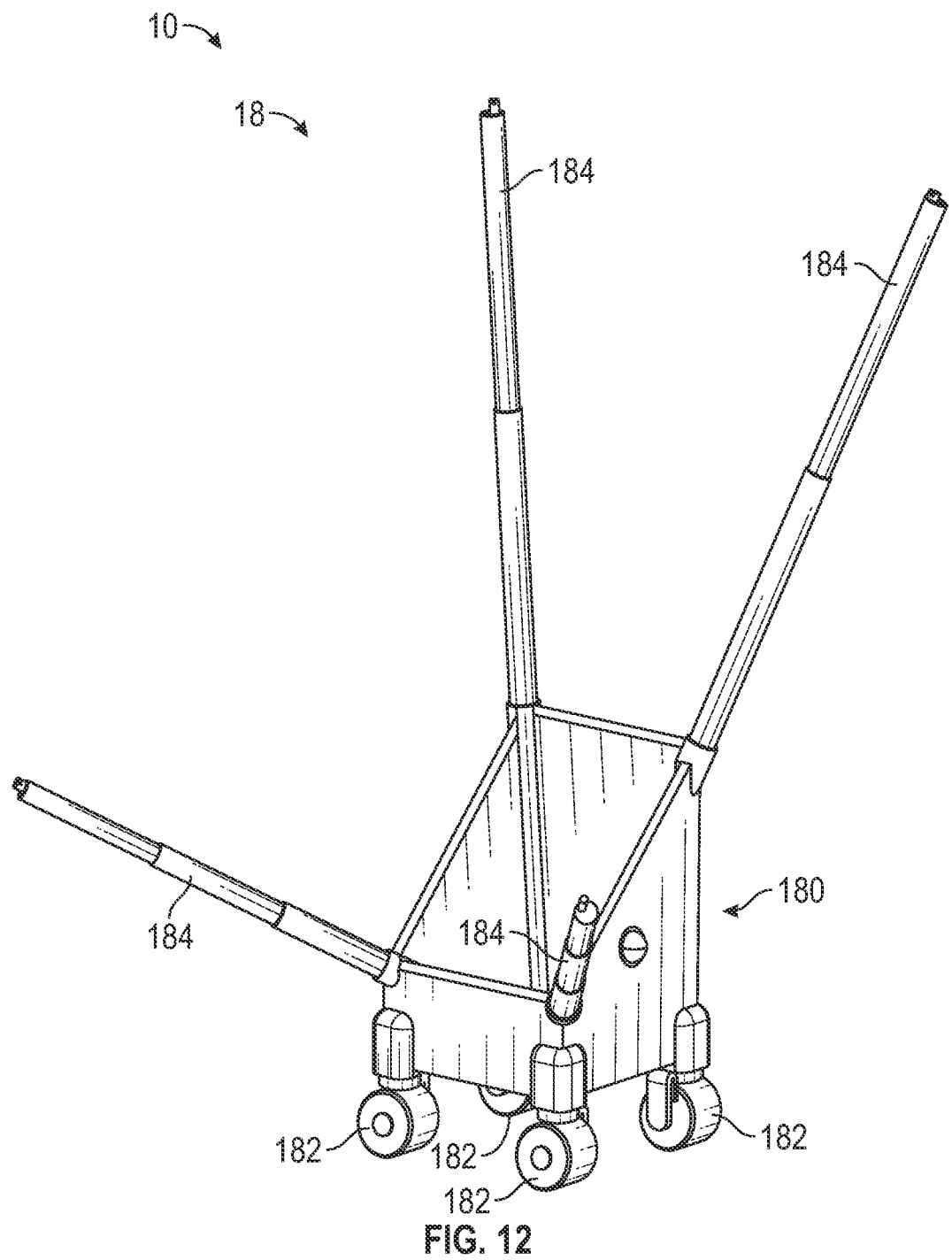
FIG. 12 is a perspective view of a projectile catcher of the lunar excavation and projectile transport system of FIG. 1, according to an exemplary embodiment.
Figure 13:
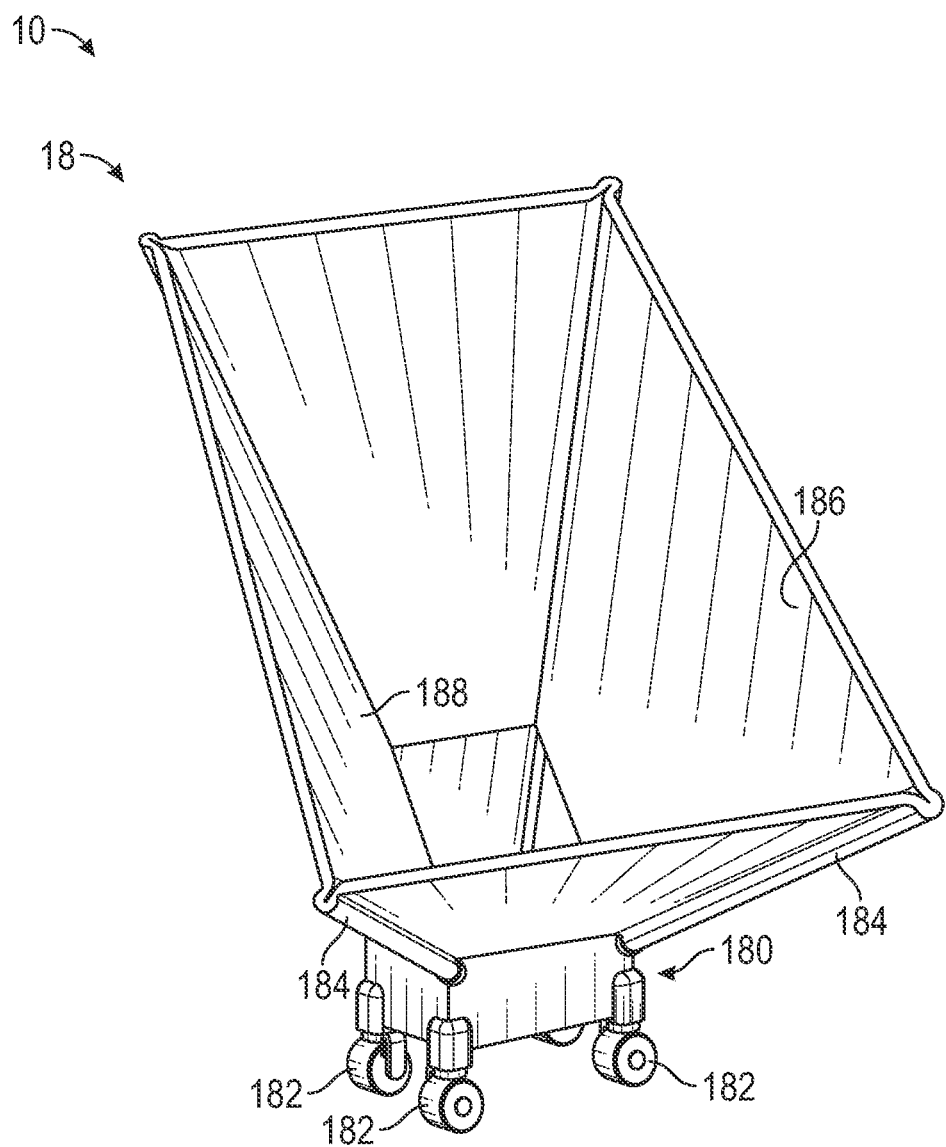
FIG. 13 is a perspective view of the projectile catcher of FIG. 12 with a fabric installed, according to an exemplary embodiment.
Figure 14:
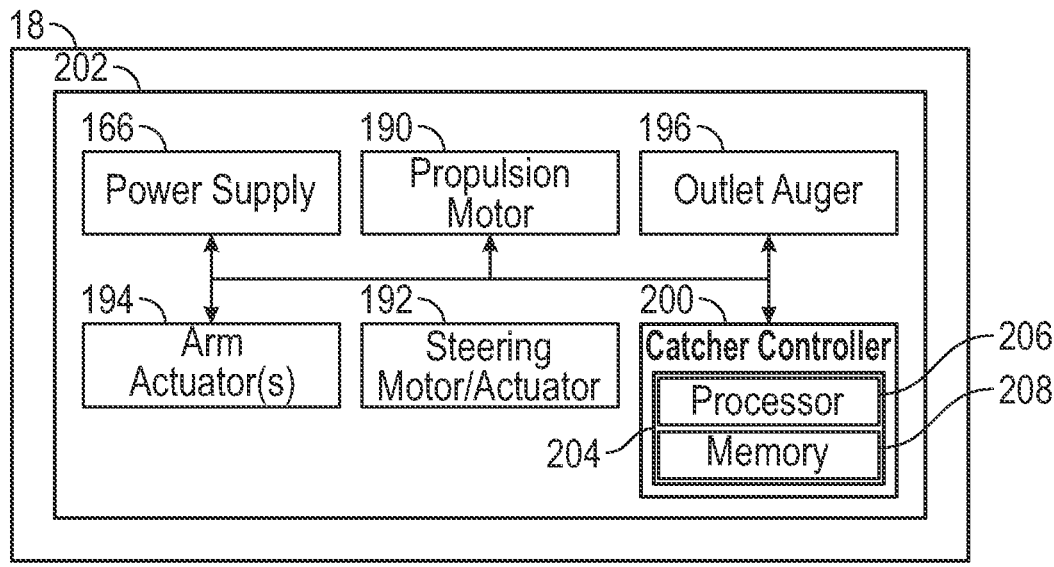
FIG. 14 is a block diagram of components of the projectile catcher of FIG. 12, according to an exemplary embodiment.
Figure 15:
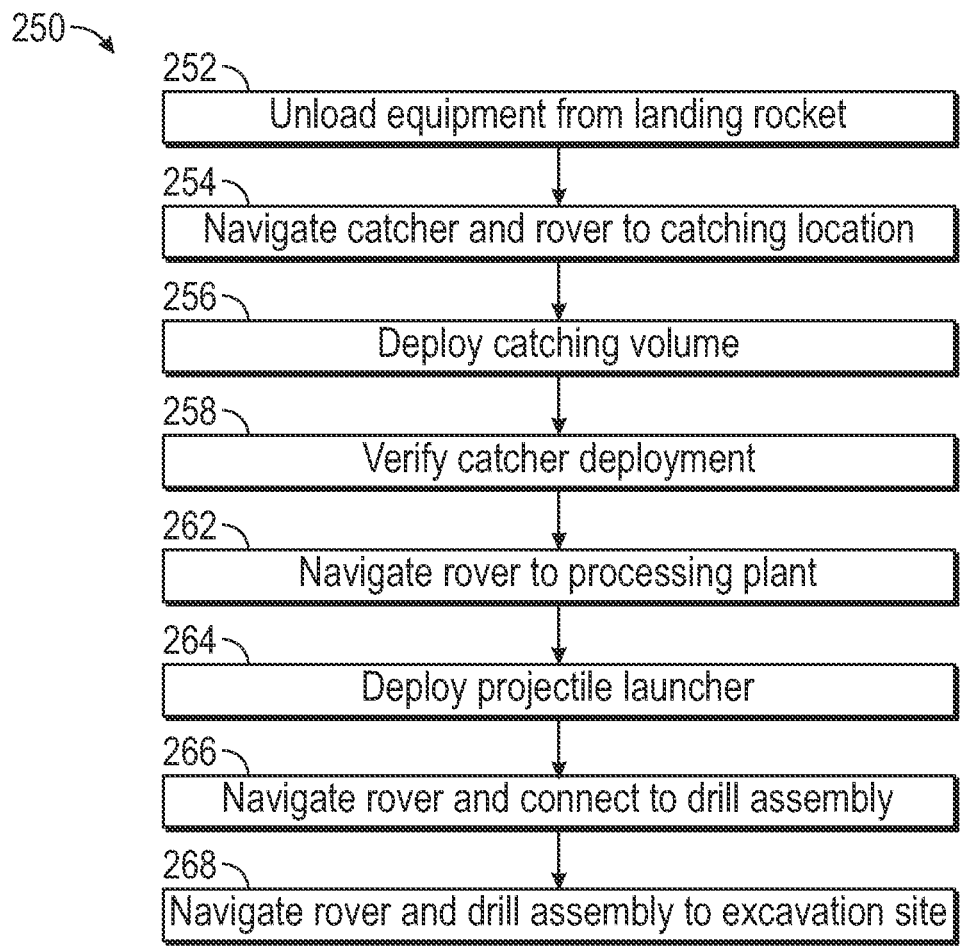
FIG. 15 is a block diagram outlining the steps in a method for deploying a lunar excavation and projectile transport system, according to an exemplary embodiment.
Figure 16:
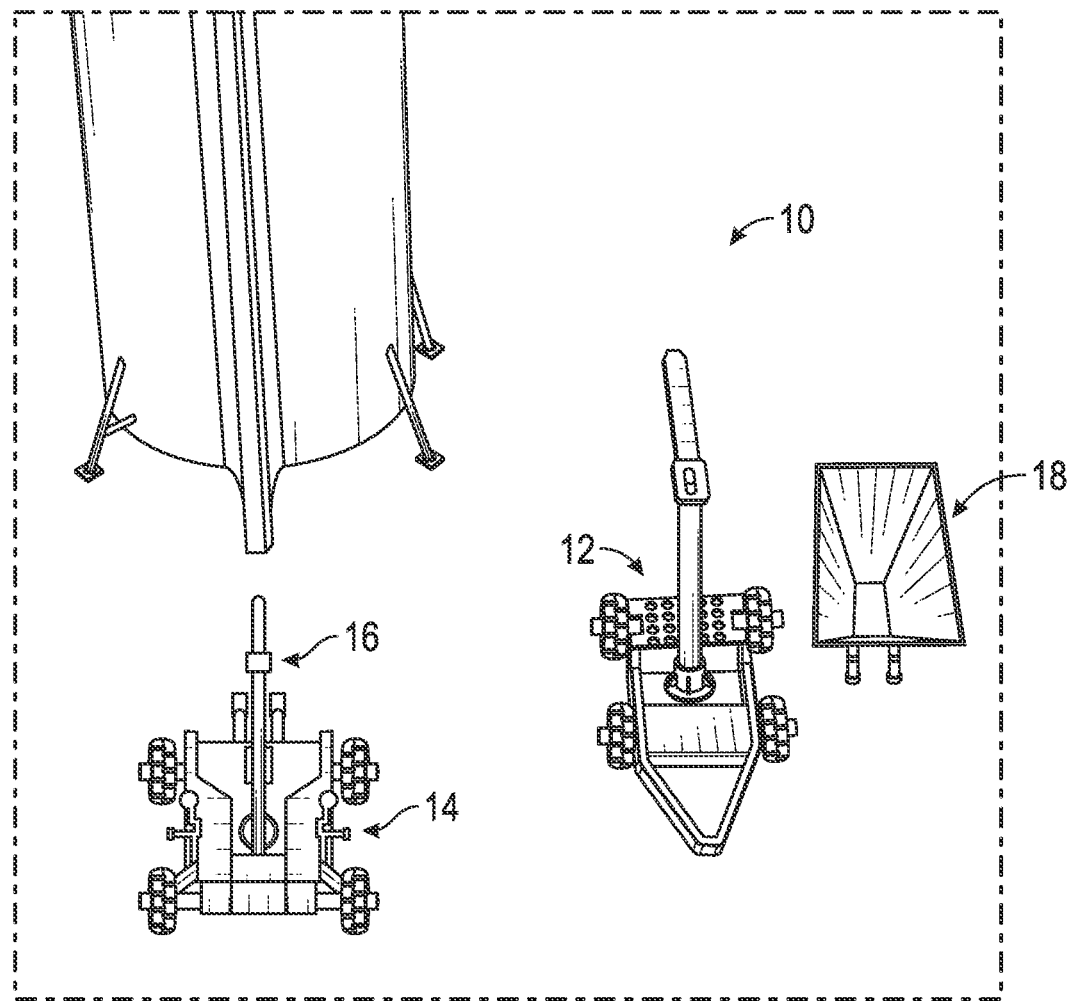
FIG. 16 is a perspective view of the lunar excavation and projectile transport system of FIG. 1 unloaded from a landing rocket, according to an exemplary embodiment.

Referring now to FIGS. 12-14, the projectile catcher 18 includes a storage body 180, a plurality of catcher wheels 182 rotatably coupled to the storage body 180, a plurality of telescoping arms 184 coupled to the storage body 180, and a fabric 186 wrapped around each of the telescoping arms 184 to define a catching volume 188 within which a processed core sample is configured to be received (see, e.g., FIG. 13). The storage body 180 is supported on the plurality of catcher wheels 182 and each of the telescoping arms 184 extends from a corner of the storage body 180. The projectile catcher 18 is self-propelled and at least one of the catcher wheels 182 is coupled to a propulsion motor 190 (e.g., an electric motor) and configured to drive the catcher wheels 182 and propel the projectile catcher 18 at a predefined speed. The projectile catcher 18 includes a steering motor/actuator 192 that is coupled to at least one of the catcher wheels 182 and configured to control a steering direction of the catcher wheels 182 and, thereby, the steering direction of the projectile catcher 18.

In some embodiments, each of the telescoping arms 184 is coupled to an arm actuator 194 (e.g., an electromagnetic actuator, a linear actuator, etc.). The arm actuators 194 are configured to selectively extend the telescoping arms 184 between a retracted state where the telescoping arms 184 are retracted into the storage body 180 and an extended state where the telescoping arms 184 are extended from the storage body 180. In general, the telescoping arms 184 extend outwardly to provide a larger catching volume 188 for the processed core samples that are launched from the projectile launcher 16. In some embodiments, the telescoping arms 184 are manually moved between the retracted state and the extended state, for example, by the robotic arm 84 on the rover 14. In these embodiments, the projectile catcher 18 does not include the arm actuators 194.

The fabric 186 is wrapped around each of the telescoping arms 184 and defines the outer periphery of the catching volume 188 (see, e.g., FIG. 13). In some embodiments, the fabric 186 is a mesh fabric that includes hydrophobic properties to aid in preventing the processed core samples (e.g., ice) from sublimating. In some embodiments, the fabric 186 includes holes or tunnels that extend through the corners of the fabric 186 and the telescoping arms 184 are received within the tunnels. The distal ends of the telescoping arms 184 can be permanently attached to the tunnels within the fabric 186 so that the fabric 186 collapses and expends with the telescoping arms 184.

In some embodiments, the projectile catcher 18 includes an outlet port with an outlet auger 196 that extends into the storage body 180. The outlet auger 196 is configured to selectively rotate and feed processed ice samples that are caught within the storage body 180 out of the outlet port where they are collected.

With specific reference to FIG. 14, the projectile catcher 18 includes the propulsion motor 190, the steering motor/actuator 192, the arm actuators 194, the outlet auger 196, a power supply 198, and a catcher controller 200. In general, all of the electrical components of the projectile catcher 18 are arranged within the storage body 180 and a thermal management system 202 maintains the electrical components at a stable operating temperatures. In some embodiments, the thermal management system 202 includes one or more heaters that are selectively controlled, for example, by the catcher controller 200 to maintain the stable operating temperatures. In some embodiments, the power supply 198 is a rechargeable battery that is arranged with the storage body 180. The power supply 198 is configured to supply electrical power to each of the propulsion motor 190, the steering motor/actuator 192, the arm actuators 194, the outlet auger 196, and the catcher controller 200.

The catcher controller 200 is in communication with the propulsion motor 190, the steering motor/actuator 192, the arm actuators 194, the outlet auger 196. The catcher controller 200 is configured to control the operation of each of the propulsion motor 190, the steering motor/actuator 192, the arm actuators 194, the outlet auger 196. The catcher controller 200 includes a processing circuit 204 having a processor 206 and memory 208. The processing circuit 204 can be communicably connected to a communications interface such that the processing circuit 204 and the various components thereof can send and receive data via the communications interface. The processor 206 can be implemented as a general purpose processor, an application specific integrated circuit ("ASIC"), one or more field programmable gate arrays ("FPGAs"), a group of processing components, or other suitable electronic processing components.

The memory 208 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. The memory 208 can be or include volatile memory or non-volatile memory. The memory 208 can include database components, object code components, script components, or any other type of information structure for supporting the various activities and information structures described in the present application. According to some embodiments, the memory 208 is communicably connected to the processor 206 via the processing circuit 204 and includes computer code for executing (e.g., by the processing circuit 204 and/or the processor 206) one or more processes described herein.

Deploying Lunar Excavation and Projectile Transport System

Referring to FIGS. 15-20, a method 250 of deploying the lunar excavation and projectile transport system 10 is illustrated according to an exemplary embodiment. In general, the design of the lunar excavation and projectile transport system 10 enables efficient deployment using the rover 14 to navigate and deploy the equipment that is not self-propelled (e.g., the core drill assembly 12 and the projectile launcher 16). In some embodiments, the lunar excavation and projectile transport system 10 is loaded onto a landing rocket in a particular orientation to enable sequential deployment of the projectile launcher 16 and the core drill assembly 12. For example, the rover 14 is loaded onto the landing rocket with the projectile launcher 16 resting in and attached to the dump bed 86, so that when the equipment of the lunar excavation and projectile transport system 10 is unloaded from the landing rocket at step 252, the rover 14 carries the projectile launcher 16 off the landing rocket (see, e.g., FIG. 16). In some embodiments, at step 252, the rover 14 carries the projectile launcher 16 off the landing rocket and the projectile catcher 18 self-propels off the landing rocket with the rover 14.

With the projectile catcher 18 and the rover 14 unloaded from the landing rocket, the projectile catcher 18 navigates to a catching location or a delivery site at step 254. Once the projectile catcher 18 reaches the catching location, the projectile catcher 18 is deployed at step 256. In some embodiments, as the projectile catcher 18 is deployed at step 256, the telescoping arms 184 extend from the retracted position to the extended position, which expands the telescoping arms 184 and the fabric 186 attached thereto to deploy the catching volume 188. In some embodiments, the projectile catcher 18 is deployed adjacent to the landing rocket (see, e.g., FIG. 16) and either the landing rocket or another rocket adjacent to the landing site is utilized for transportation back to Earth.

In some embodiments, the rover 14 also navigates to the catching location and verifies the deployment of the projectile catcher 18 at step 258. For example, the rover 14 can use the one or more cameras 100 to verify that the telescoping arms 184 deployed to the extended position and that the catching volume 188 was expanded. The LIDAR sensor and the radar sensor can verify a location of the projectile catcher 18. With deployment of the projectile catcher 18 verified at step 258, the rover 14, with the projectile launcher 16 coupled thereto, navigates to a processing plant 260 at step 262 (see, e.g., FIG. 17). Once the rover 14 reaches the processing plant 260, which is also the launching location, the rover 14 deploys the projectile launcher 16 at step 264. To deploy the projectile launcher 16, the rover 14 actuates the dump bed 86 from the stowed position (see, e.g., FIG. 17) to the dump position (see, e.g., FIG. 18), which tilts the projectile launcher 16 upright into a vertical position. As the projectile launcher 16 is tilted to an upright position, the legs 126 pivot relative to the cylindrical portion 128 and spread out to support the projectile launcher 16 upon the lunar surface (see, e.g., FIG. 19). In some embodiments, the leg actuators 132 are configured to pivot the legs 126 relative to the cylindrical portion 128 to spread out the legs 126 during deployment.

In some embodiments, the rover 14 maneuvers around the projectile launcher 16 after it's deployed to make an electrical connection between the projectile launcher 16 and the processing plant 260 using the robotic arm 84 (e.g., the power supply 164 for the projectile launcher 16 can be arranged within the processing plant 260). In some embodiments, the robotic arm 84 of the rover 14 secures the ground pads 130 of the projectile launcher 16 with a stake or another fastener. In some embodiments, the one or more cameras 100, the LIDAR sensor, and the radar sensor on the rover 14 are configured to verify that the projectile launcher 16 is deployed and arranged in a predefined launch location that aligns with a planned trajectory for a processed core sample to travel between the projectile launcher 16 and the projectile catcher 18.

With the projectile launcher 16 deployed at step 264, the rover 14 navigates back to the landing rocket and connects to the core drill assembly 12 at step 266. For example, the rover 14 uses the towing hitch 88 to connect to towing linkage or coupling on the drilling platform 20. The rover 14 then tows the core drill assembly 12 to an excavation site at step 268 (see, e.g., FIG. 20). Once the core drill assembly 12 is towed to the excavation site, the core drill assembly 12 begins to harvest icy regolith from below the lunar surface as will be described below. In some embodiments, when the core drill assembly 12 is arranged at the excavation site, the robotic arm 84 of the rover 14 is used to connect the core drill assembly 12 to a power supply located at the excavation site (e.g., the power supply 66 is arranged remotely from the platform enclosure 40).

Excavating and Transporting Icy Regolith

Referring to FIGS. 21-29, a method 300 of excavating and transporting icy regolith from below a lunar surface with the lunar excavation and projectile transport system 10 is illustrated according to an exemplary embodiment. As described above, after deployment of the lunar excavation and projectile transport system 10, the core drill assembly 12 is arranged at the excavation site. After the rover 14 positions the core drill assembly 12, the rover 14 disconnects from the core drill assembly 12 and moves to a position next to the core drill assembly 12 where the rover 14 is ready to receive harvested core samples (see, e.g., FIG. 22). Once the core drill assembly 12 and the rover 14 are in position, excavation begins at step 302 where core samples are excavated and stored in the rover 14. At step 302, the ultrasonic drill 24 is lowered through one of the guide holes 42 and the drill bit 62 drills into the lunar surface to a predefined depth. In some embodiments, the core drill assembly 12 is configured to harvest 4 core samples from each guide hole 42 (e.g., 4 core samples through the same guide hole 42 at different depths). In some embodiments, the core samples excavated by the ultrasonic drill 24 are between about 80 cm and about 100 cm in length, or between about 80 cm and about 90 cm in length, or about 87.5 cm in length.

After each core sample is excavated by the ultrasonic drill 24, the ultrasonic drill 24 is raised out of the excavated hole by the drill actuator 56 so that the ultrasonic drill 24 is positioned above the guide plate 38. The crane beam 48 is then rotated by the crane actuator 58 so that the ultrasonic drill 24, with the core sample arranged therein, is positioned over the dump bed 86 and the ultrasonic drill 24 then drops the core sample into the dump bed 86 (see, e.g., FIG. 23). After the harvested core sample is dropped into the dump bed 86, the crane beam 48 rotates back to align the ultrasonic drill 24 with the appropriate guide hole 42 and another core sample is excavated by the ultrasonic drill 24.

Once a predefined number of core samples are loaded into the dump bed 86 of the rover 14, the rover 14 transports the harvested core samples to the processing plant 260 at step 304. The rover 14 navigates to the processing plant 260 and backs up to the processing plant 260 so that the dump bed 86 faces a hopper of the processing plant 260 (see, e.g., FIG. 24). The dump bed 86 then moves from the stowed position to the dump position via the dump bed actuator 104, and the core samples within the dump bed 86 are dumped into the hopper of the processing plant 260 at step 306 (see, e.g., FIG. 25).

The processing plant 260 is configured to process the harvested core samples and extract, for example, water (e.g., ice) from the harvested icy regolith. In some embodiments, the processing plant is configured to output processed core samples with a predefined shape and size (e.g., cubes of ice). Once the processing plant finishes processing the core samples, the processed core samples 308 are fed into the throwing arm 122 by a conveyor chute 310 that extends from the processing plant 260 at step 312 (see, e.g., FIG. 26). In some embodiments, when deploying the projectile launcher 16, the projectile launcher 16 is deployed in a location that aligns the conveyor chute 310 with the channel 144 within the throwing arm 122 to enable the processed core samples 308 to be gravity fed into the channel 144. In some embodiments, the conveyor chute 310 is rotatably coupled to the processing plant 260 so that the conveyor chute 310 rotates away from the processing plant 260 to feed the processed core samples 308 into the throwing arm 122 and then rotates toward the processing plant 260 to clear space for the throwing arm 122 to rotate.

In some embodiments, the conveyor chute 310 is configured to feed a predefined number of processed core samples 308 into the throwing arm 122. Once the throwing arm 122 is fed with the predefined number of processed core samples 308, the conveyor chute 310 rotates toward the processing plant 260 and away from the projectile launcher 16 and the processed core samples 308 are launched by the projectile launcher 16 into the catching volume 188 of the projectile catcher 18 at step 314. For example, the throwing arm motor 136 rotates the throwing arm 122 at a predefined rotational speed (see, e.g., FIG. 27) that corresponds with a predefined trajectory that the processed core samples 308 travel after being launched from the throwing arm 122. When the throwing arm 122 reaches the predefined rotational speed (e.g., as measured by the rotational speed sensor 166), the release mechanism 124 is configured to selectively unblock a processed core sample 308 at a predefined location along the rotational path of the throwing arm 122 (e.g., as measured by the rotational encoder 168). Once a processed core sample 308 is unblocked, it launches from the outlet end 140 of the throwing arm 122 (see, e.g., FIG. 28) and travels along the predefined trajectory (e.g., as set by the rotational speed, the rotational position of launch, the height of launch, the gravity on the lunar surface, and friction).

The projectile catcher 18 is arranged in a location that intersects the predefined trajectory traversed by the launched processed core samples 308. For example, the launched processed core samples 308 land in the catching volume 188 of the projectile catcher 18 (see, e.g., FIG. 29) and the processed core samples 308 are extracted from the projectile catcher 18 for transport from the lunar surface. In some embodiments, the camera 170 captures an image of the launch conditions and the launch conditions are communicated to the catcher controller 200. The catcher controller 200 is configured to adjust a position of the projectile catcher 18 via the propulsion motor 190 and the steering motor/actuator 192 in response to the launch conditions detected by the camera 170. In some embodiments, the processed core samples 308 are launched at a speed between about 60 meters per second (m/s) and about 100 m/s, or between about 70 m/s and about 90 m/s, or about 80 m/s. In some embodiments, the processed core samples 308 are launched a distance of at least 3 kilometers (km), or about 4 km, or between about 3 km and about 4 km.

In general, the incorporation of the projectile launcher 16 into the lunar excavation and projectile transport system 10 reduces the travel requirements of the rover 14 when retrieving the processed core samples. For example, the projectile launcher 16 is arranged a predefined distance away from the projectile catcher 18 (and a retrieval/launch rocket) and the rover 14 is not required to travel this distance to harvest the processed core samples. In some embodiments, the core drill assembly 12 and the processing plant 260 can be arranged with a PSR on the lunar body and the projectile catcher 18 can be arranged outside of the PSR in a region that is more efficient to travel back to Earth. In this way, for example, the processed core samples can stay within the PSR longer to reduce the potential for sublimation, and projectile launcher 16 can quickly transfer the processed core samples from the PSR to the projectile catcher 18 for storage.

As utilized herein with respect to numerical ranges, the terms "approximately," "about," "substantially," and similar terms generally mean +/−10% of the disclosed values. When the terms "approximately," "about," "substantially," and similar terms are applied to a structural feature (e.g., to describe its shape, size, orientation, direction, etc.), these terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the lunar excavation and projectile transport system 10 and the systems and components thereof as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

The invention claimed is:

1. A lunar excavation and projectile transport system for harvesting icy regolith from below a lunar surface, the lunar excavation and projectile transport system comprising:
   a core drill assembly including:
      a drilling platform including a plurality of drill wheels rotatably coupled to the drilling platform and a guide plate including a plurality of guide holes extending through the guide plate and arranged in a array pattern;
      a tower crane supported on the drilling platform; and
      an ultrasonic drill coupled to the tower crane so that the ultrasonic drill is configured to selectively move a vertical direction toward and away from the guide plate;
   a rover including a body, a plurality of rover wheels coupled to the body, and a dump bed pivotally coupled to the body;
   a projectile launcher including a base and a throwing arm, wherein the throwing arm is rotatably coupled to the base and arranged at a mounting angle relative to a central axis defined by the base, wherein the mounting angle defines a lunch angle for a processed core sample that is launched from within the throwing arm during rotation of the throwing arm by an electric motor; and
   a projectile catcher including a storage body, a plurality of telescoping arms coupled to the storage body, and a fabric wrapped around each of the plurality of telescoping arms to define a catching volume within which the processed core sample launched by the projectile launcher is caught.

2. The lunar excavation and projectile transport system of claim 1, wherein each of the plurality of guide holes includes a keyed notch recess, and an outer casing of the ultrasonic drill includes a keyed notch extension extending axially along a length of the outer casing.

3. The lunar excavation and projectile transport system of claim 2, wherein when the keyed notch extension is received within a respective one of the keyed notch recesses, the outer casing is prevented from rotating.

4. The lunar excavation and projectile transport system of claim 1, wherein the tower crane includes a mast and a crane beam coupled to a distal end of the mast, the crane beam including a drill carriage that is linearly movable along the crane beam and coupled to the ultrasonic drill.

5. The lunar excavation and projectile transport system of claim 4, wherein the tower crane includes a crane actuator that is configured to rotate the crane beam relative to the guide plate.

6. The lunar excavation and projectile transport system of claim 4, wherein the ultrasonic drill is coupled to the drill carriage by a wireline that extends from a within the drill carriage.

7. The lunar excavation and projectile transport system of claim 1, wherein the dump bed is coupled to a dump bed actuator that is configured to selectively pivot the dump bed relative to the body between a stowed position and a dump position.

8. The lunar excavation and projectile transport system of claim 1, wherein the base includes a plurality of legs rotatably coupled to a cylindrical portion.

9. The lunar excavation and projectile transport system of claim 8, wherein each of the plurality of legs is a telescoping leg that is coupled to a leg actuator, the leg actuators being configured to selectively adjust an operating height of the throwing arm.

10. The lunar excavation and projectile transport system of claim 1, wherein the projectile launcher includes a rotational speed sensor and a rotational encoder, the rotational speed sensor being configured to measure a speed of the electric motor and the rotational encoder being configured to measure a rotational position of the throwing arm.

11. The lunar excavation and projectile transport system of claim 1, wherein the projectile launcher includes a notched wheel arranged at a distal end of the throwing arm, the notched wheel including a plurality of protrusions.

12. The lunar excavation and projectile transport system of claim 11, wherein the notched wheel is coupled to a release actuator that is configured to selectively move the plurality of protrusions to selectively block and unblock the processed core sample within the throwing arm.

13. The lunar excavation and projectile transport system of claim 1, wherein when the notched wheel unblocks the processed core sample, the processed core sample is launched from the throwing arm.

14. A lunar excavation and projectile transport system for harvesting icy regolith from below a lunar surface, the lunar excavation and projectile transport system comprising:
   a core drill assembly including:
      a drilling platform including a plurality of drill wheels rotatably coupled to the drilling platform and a guide plate including a plurality of guide holes extending through the guide plate and arranged in a array pattern;
      a tower crane supported on the drilling platform; and
      an ultrasonic drill coupled to the tower crane so that the ultrasonic drill is configured to selectively move a vertical direction toward and away from the guide plate;
   a rover including a body, a plurality of rover wheels coupled to the body, and a dump bed pivotally coupled to the body;
   a projectile launcher including a base, a throwing arm, and a release mechanism, wherein the throwing arm is rotatably coupled to the base and an electric motor is coupled to the throwing arm and configured to selectively rotate the throwing arm at a predefined rotational speed, wherein the throwing arm is mounted to the base so that the throwing arm is arranged at a predefined launch angle relative to the base, and wherein the release mechanism includes a protrusion that is configured to selectively unblock a processed core sample within the throwing arm during rotation of the throwing arm to launch the processed core sample from the throwing arm; and a projectile catcher including a storage body, a plurality of telescoping arms coupled to the storage body, and a fabric wrapped around each of the plurality of telescoping arms to define a catching volume within which the processed core sample launched by the projectile launcher is caught.

15. The lunar excavation and projectile transport system of claim 14, wherein the protrusion is arranged on a notched wheel that is mounted at a distal end of the throwing arm.

16. The lunar excavation and projectile transport system of claim 15, wherein the notched wheel is coupled to a release actuator that is configured to selectively move the protrusion to selectively unblock the processed core sample within the throwing arm.

17. The lunar excavation and projectile transport system of claim 14, wherein the base includes a plurality of legs rotatably coupled to a cylindrical portion.

18. The lunar excavation and projectile transport system of claim 17, and wherein each of the plurality of legs is a telescoping leg that is coupled to a leg actuator, the leg actuators being configured to selectively adjust an operating height of the throwing arm.

19. The lunar excavation and projectile transport system of claim 14, wherein the projectile launcher includes a rotational speed sensor and a rotational encoder, the rotational speed sensor being configured to measure a speed of the electric motor and the rotational encoder being configured to measure a rotational position of the throwing arm.

20. A method of excavating and transporting icy regolith, the method comprising:

drilling a core sample from below a lunar surface with an ultrasonic drill;

depositing the core sample within a dump bed of a rover;

navigating the rover to a processing plant having a hopper;

pivoting the dump bed to deposit the core sample within the hopper;

feeding a processed core sample into a throwing arm of a projectile launcher;

rotating the throwing arm at a predefined rotational speed and selectively releasing the processed core sample to launch the processed core sample toward a projectile catcher; and catching the processed core sample within a catching volume of the projectile catcher.

* * * * *